United States Patent [19]
Shimada et al.

[11] Patent Number: 5,907,859
[45] Date of Patent: May 25, 1999

[54] STORAGE DEVICE IN WHICH READ/WRITE OPERATION IS CONTROLLED IN RESPONSE TO SOURCE VOLTAGE

[75] Inventors: Kunihiro Shimada; Kazuhiko Takaishi, both of Kawasaki; Eisaku Takahashi, Higashine, all of Japan

[73] Assignee: Fukitsu Limited, Kawasaki, Japan

[21] Appl. No.: 08/971,469

[22] Filed: Nov. 17, 1997

Related U.S. Application Data

[63] Continuation of application No. 08/420,206, Apr. 11, 1995, abandoned.

[30] Foreign Application Priority Data

May 9, 1994 [JP] Japan ..................................... 6-095266

[51] Int. Cl.⁶ ............................. G06F 12/16; G06F 11/30
[52] U.S. Cl. ............... 711/112; 395/750.01; 395/750.08; 395/182.03; 395/182.12; 395/182.2
[58] Field of Search ........................ 395/750.01, 750.08, 395/182.2, 182.12, 182.03; 365/227; 711/162, 112

[56] References Cited

U.S. PATENT DOCUMENTS

| | | | |
|---|---|---|---|
| 4,096,560 | 6/1978 | Footh | 395/182.2 |
| 4,689,698 | 8/1987 | Ishikawa et al. | 369/69 |
| 4,777,626 | 10/1988 | Matsushita et al. | 395/182.2 |
| 5,193,176 | 3/1993 | Brandin | 395/182.12 |
| 5,313,612 | 5/1994 | Satoh et al. | 711/162 |
| 5,412,809 | 5/1995 | Tam et al. | 395/750.06 |
| 5,452,277 | 9/1995 | Bajorek et al. | 395/750.08 |
| 5,638,307 | 6/1997 | Kamimura et al. | 395/750.08 |

FOREIGN PATENT DOCUMENTS

| | | |
|---|---|---|
| 59-220856 | 12/1984 | Japan . |
| 63-44379 | 2/1988 | Japan . |
| 2-198074 | 8/1990 | Japan . |
| 5137393 | 6/1993 | Japan . |
| 5258488 | 10/1993 | Japan . |

*Primary Examiner*—Eddie P. Chan
*Assistant Examiner*—Reginald G. Bragdon
*Attorney, Agent, or Firm*—Greer, Burns & Crain Ltd.

[57] ABSTRACT

A storage device includes: a read/write mechanism which is actuated in accordance with a selected one of two or more sets of control data so that a read/write operation is carried out to read data from or write data onto a recording medium; a detection unit for detecting a source voltage from a host system, and for detecting whether one of source voltages from the host system has been switched to another source voltage; a control unit for controlling the read/write operation of the read/write mechanism in accordance with the detected source voltage; and a reset unit for resetting the control unit to an initial condition when the switching from the one of the source voltages to the another source voltage is detected as being in process, so that the controlling of the read/write mechanism is withheld until the end of the switching.

10 Claims, 30 Drawing Sheets

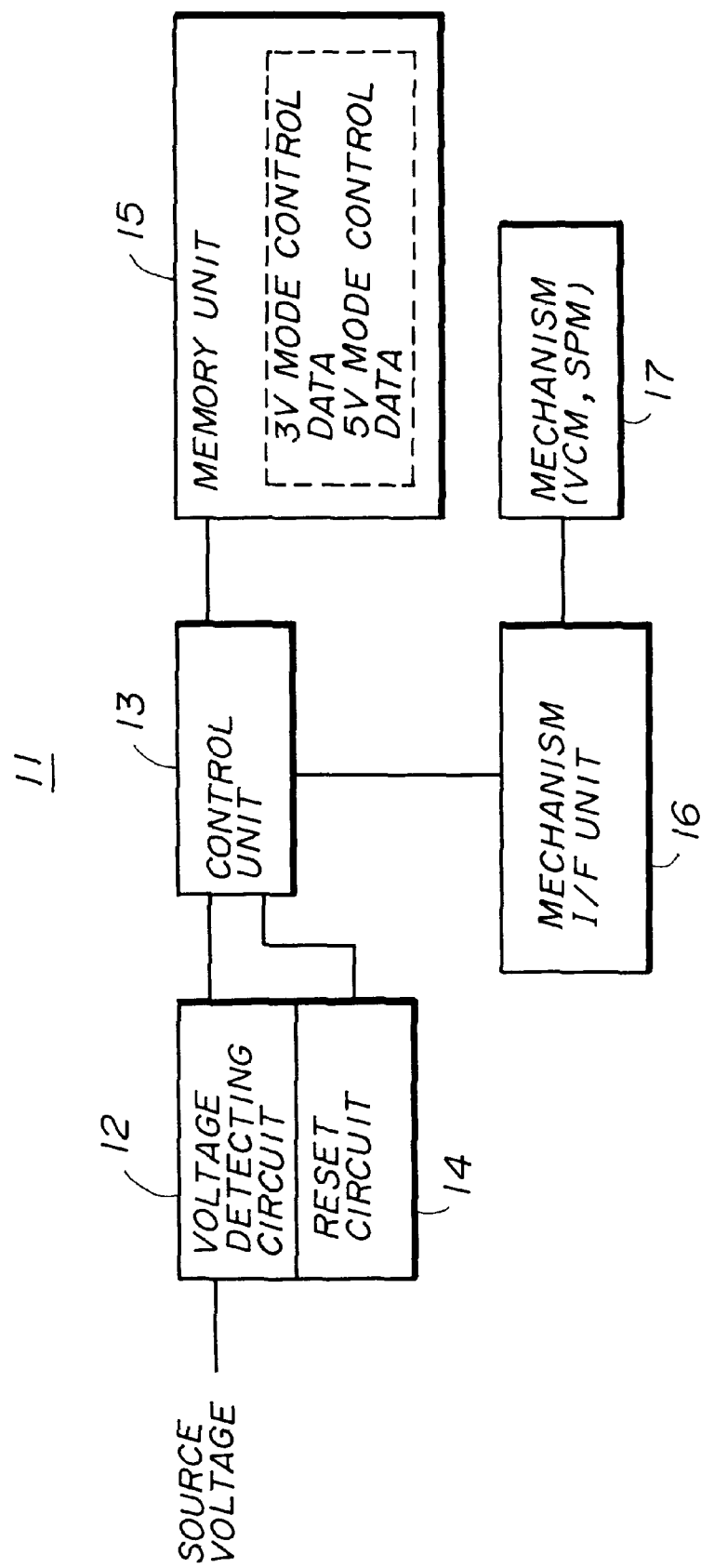

5V MODE SEEK SPEED MAP

3V MODE SEEK SPEED MAP

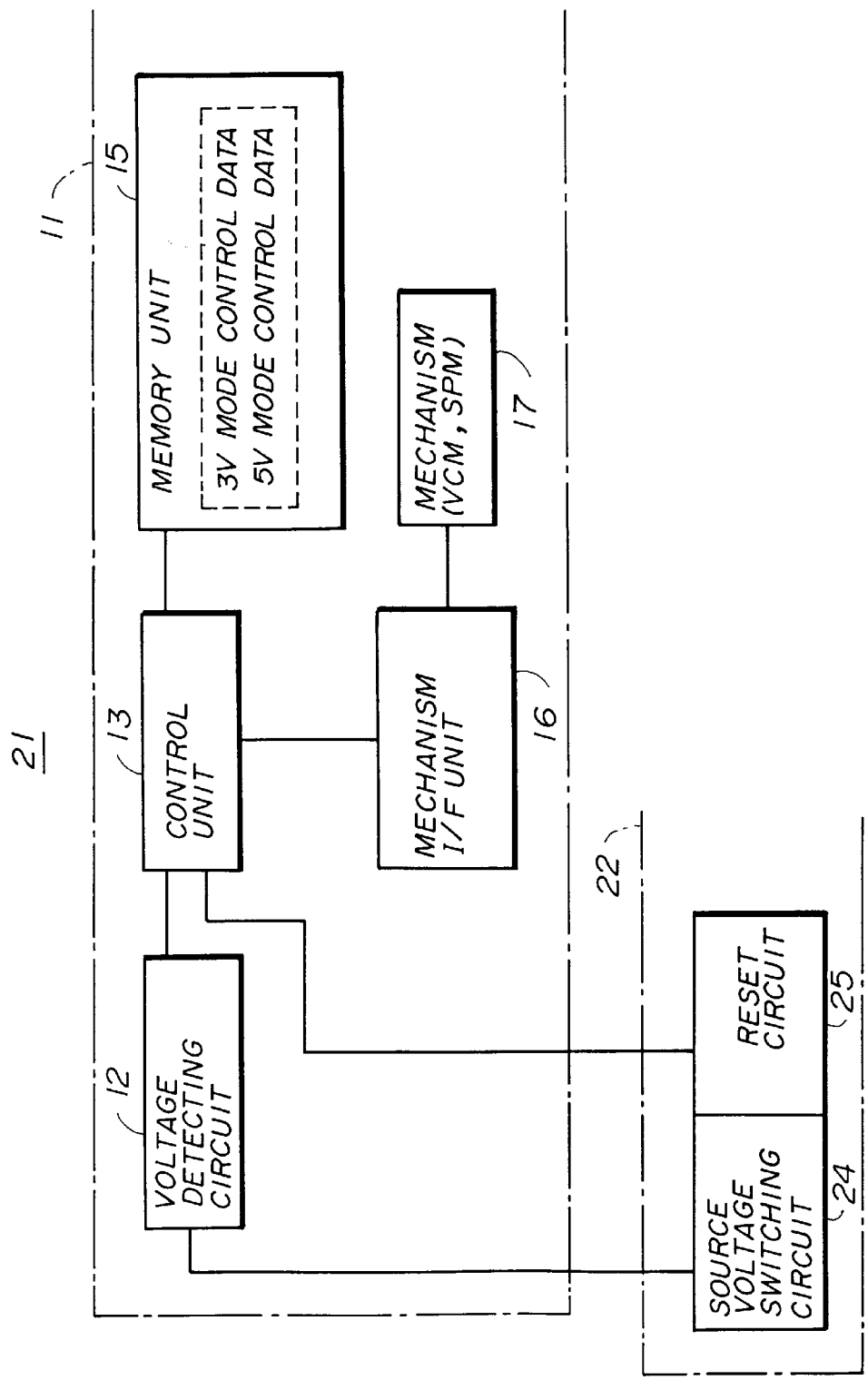

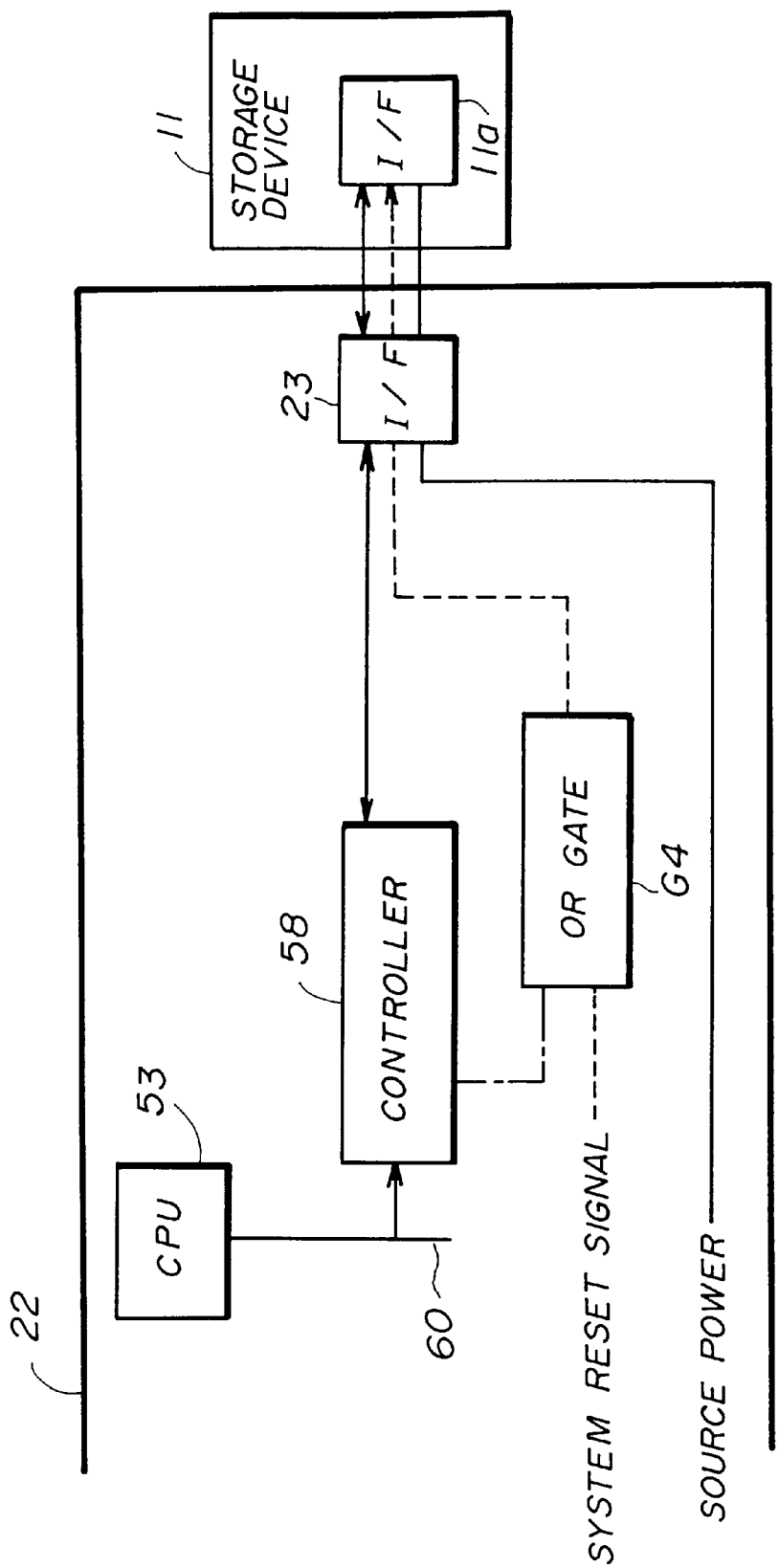

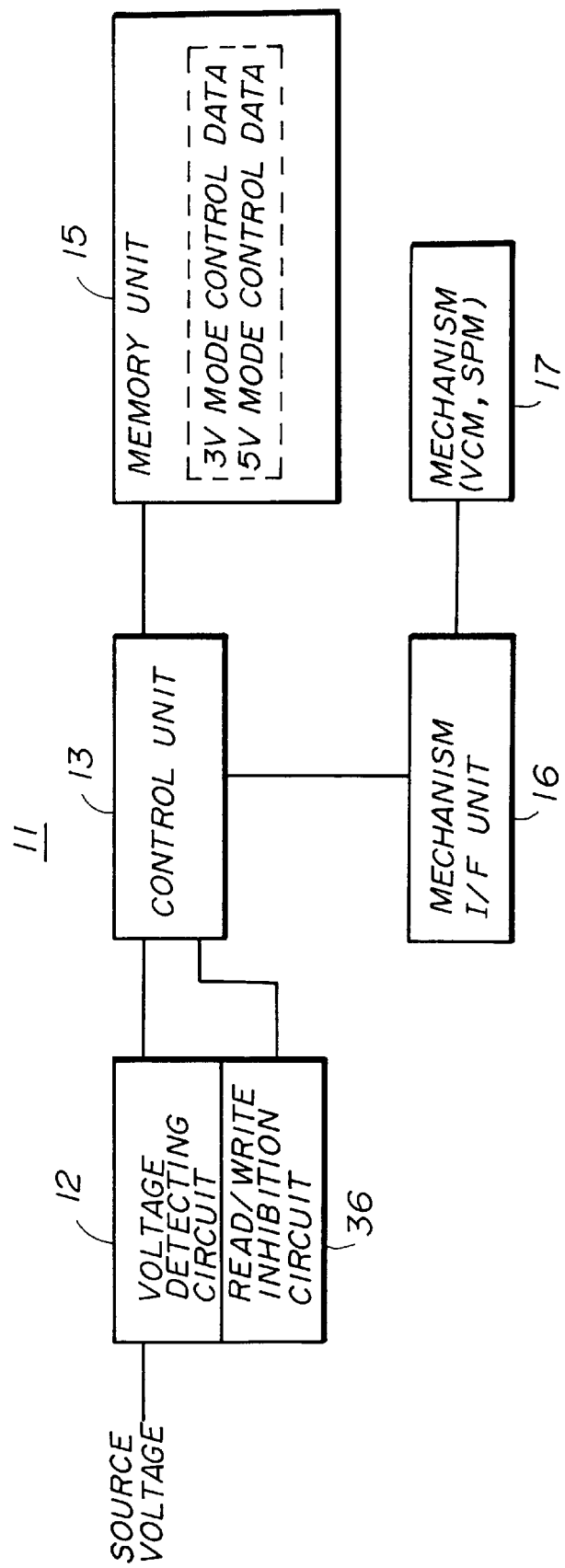

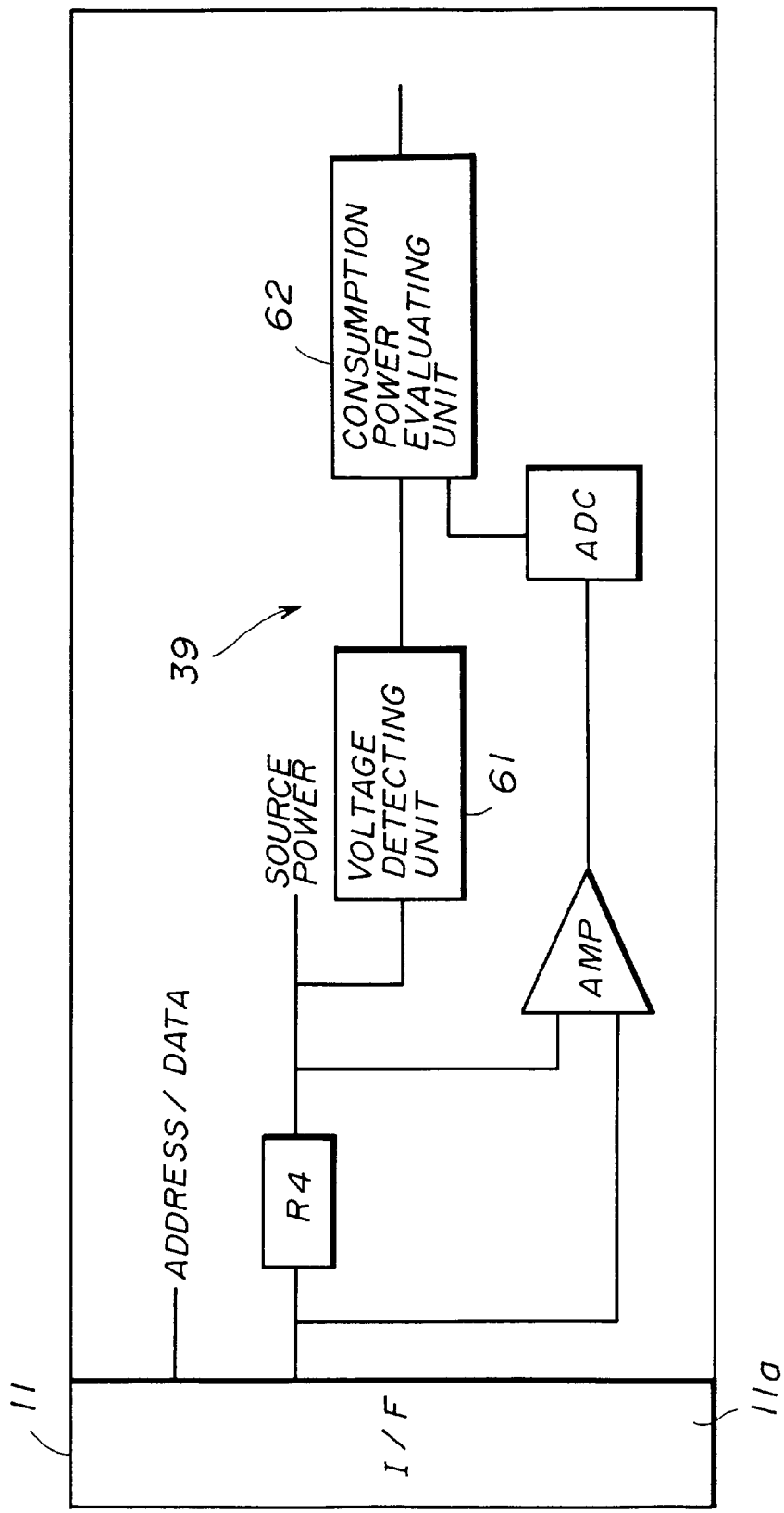

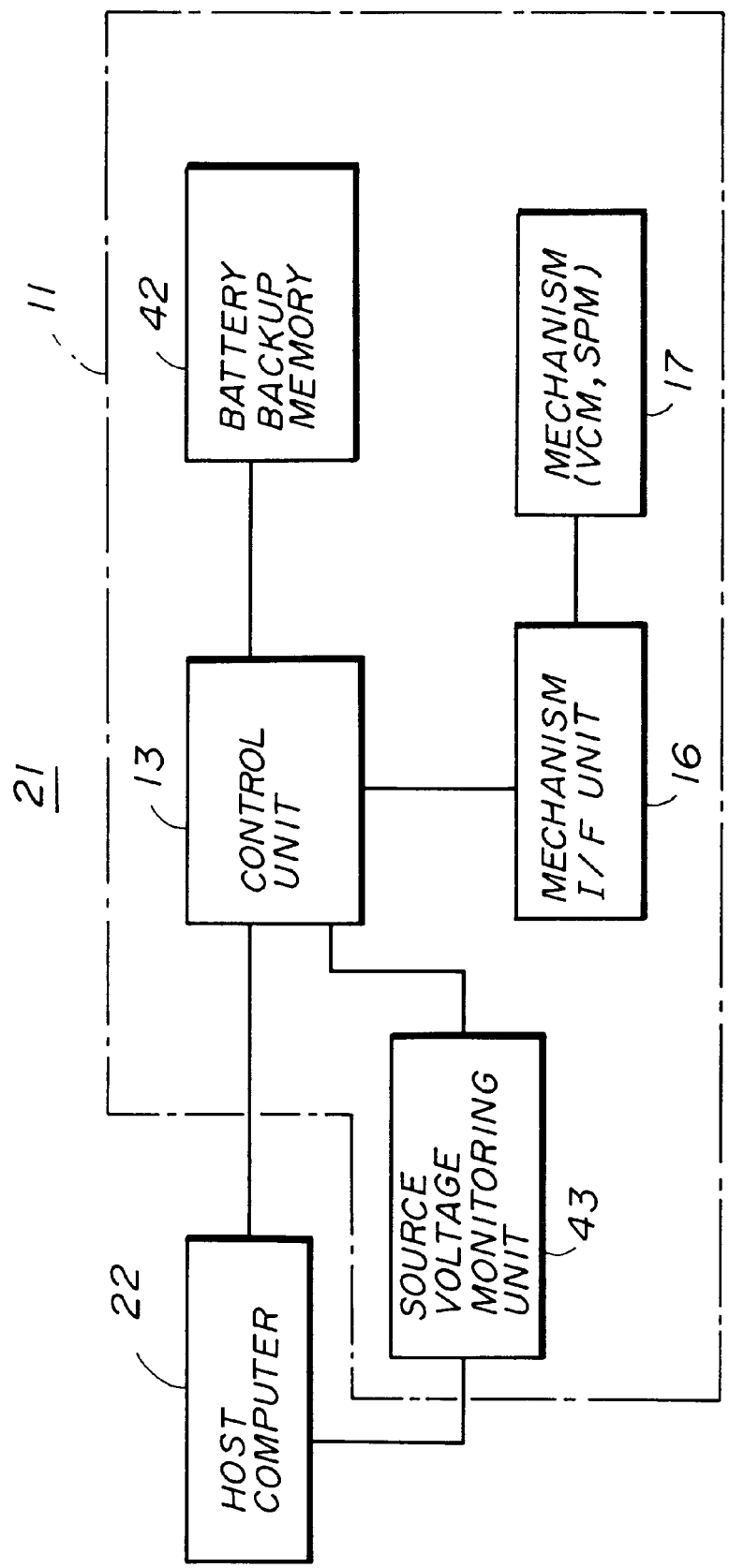

STORAGE DEVICE IN WHICH READ/WRITE OPERATION IS CONTROLLED IN RESPONSE TO SOURCE VOLTAGE

This application is a continuation of copending application Ser. No. 08/420,206 filed on Apr. 11 1995, now abandoned.

BACKGROUND OF THE INVENTION

(1) Field of the Invention

The present invention generally relates to a storage device, and more particularly to a storage device in which a source power is supplied from a power supply of a host system and an access is sent from the host system to read data from or write data onto a recording medium within the storage device.

(2) Description of the Prior Art

Storage devices such as magnetic disk drives have been connected to host computers for a purpose of storing information. Recently, a computer system in which a storage device is connected as the external storage having a smaller size and a lighter weight has been developed and put into practical use. In addition, a small-size computer system including such a small-size storage device is powered by a battery, instead of by being plugged into an electric outlet.

Generally, the magnetic disk drives are provided with a read/write mechanism which includes a SPM (spindle motor) used to rotate a magnetic disk and a VCM (voice coil motor) used to move a magnetic head. This read/write mechanism is actuated by using a source power supplied from the battery-powered host computer, so that a read/write operation is carried out to read data from or write data onto a magnetic disk within the magnetic disk drive.

The battery-powered host computer mentioned above supplies the source power to the external devices, including the storage device, which are connected to the host computer.

In the above storage device which is connected to the battery-powered host computer, when the source power supplied from the host computer is varied, an electric current flowing through the read/write mechanism is also varied. If the remaining quantity of electric power contained in the battery is small, the source voltage supplied to the storage device becomes low and the electric current through the read/write mechanism becomes too small to carry out a read/write control procedure.

When the source power supplied from the battery to the read/write mechanism is low, the storage device will lack sufficient electric energy to start or continue the rotation of the VCM or the SPM of the read/write mechanism. When the storage device lacks a sufficient supplied source power, it is impossible to carry out a seek control procedure of the VCM on the read/write mechanism, for example, in accordance with seek control data.

Japanese Laid-Open Patent Application Nos.5-137393 and 5-258488 disclose a VCM speed control of a storage device, proposed as an optimum VCM speed control, wherein one of predetermined source voltages (e.g., 3 V and 5 V), supplied to the storage device, is selected by detecting a change in the source voltage from the host computer. In the storage device disclosed in the above publications, a VCM speed control procedure of the read/write mechanism is carried out in accordance with control data of a VCM speed control table related to the selected source voltage.

Generally, a rated quantity of source power is supplied to the magnetic disk drive. However, the host computer may not recognize a consumption power actually used by the magnetic disk drive. When the remaining quantity of electric energy contained in the battery of the host computer is small, a warning related to the lack of electric energy in the battery is displayed on the host computer. When the remaining quantity of the electric energy contained in the battery is smaller than a lower electricity limit that allows the host computer to normally run, the operations of the host computer and the storage device are stopped.

In the case of the conventional storage device mentioned above, one of the predetermined source voltages, supplied to the storage device, is selected by detecting a change in the source voltage from the host computer, and a switching of one of the source voltages to another source voltage is abruptly performed. There is a problem that the contents of a register of a control unit of the host computer or data stored in a memory of the host computer might be changed at random or completely lost due to the abrupt switching of the source voltage. In addition, noises might be produced due to the abrupt switching to cause a read/write error or another malfunction of the storage device.

In the case of the above conventional storage device, when the remaining quantity of electric power contained in the battery of the host computer becomes small, the storage device might be unable to continue to run a normal operation. The conventional storage device under such a condition has a problem that data which is to be written onto the recording medium abnormally resides on a memory of the host computer due to the lack of electric power contained in the battery. In addition, there is a problem that the conventional storage device is not capable of performing a reduced consumption power mode when the remaining electric power of the battery is small.

SUMMARY OF THE INVENTION

Accordingly, it is a general object of the present invention to provide an improved storage device in which the above-described problems are eliminated.

Another object of the present invention is to provide a storage device which realizes a reduction of a consumption power in accordance with a change in a source voltage supplied from a host system without changing the content of a memory of the host system at random after a switching of the source voltage takes place.

Still another object of the present invention is to provide a storage device which realizes a safe and stable operation of a read/write mechanism even after a switching of a source voltage is done.

The above-mentioned objects of the present invention are achieved by a storage device in which a source voltage is supplied from a host system and an access request is issued from the host system to read data from or write data onto a recording medium, the storage device including: a read/write mechanism which is actuated in accordance with a selected one of plural sets of control data so that a read/write operation is carried out to read the data from or write the data onto the recording medium; a detection unit for detecting a source voltage supplied from the host system, and for detecting whether the voltage level of the source voltage from the host system has been switched to a different voltage level therefor; a control unit for controlling the read/write operation of the read/write mechanism in accordance with the voltage level of the source voltage detected by the detection unit; and a reset unit, coupled to the detection unit, for resetting the control unit to an initial condition when the switching from one source voltage level to another source voltage level is detected as being in progress, so that the controlling of the read/write mechanism is withheld until the end of the switching.

The above-mentioned objects of the present invention are also achieved by a system including a host computer and a storage device connected to the host computer, wherein the voltage level of the source voltage is selectively supplied from the host computer to the storage device, and an access is sent from the host computer to read data from or write data onto a recording medium within the storage device, the storage device comprising: a read/write mechanism which is actuated in accordance with a selected one of sets of plural control data so that a read/write operation is carried out to read the data from or write the data onto the recording medium; and a control unit for controlling the read/write operation of the read/write mechanism in accordance with the source voltage supplied from the host computer, the host computer comprising: a source voltage switching unit for switching the voltage level of the source voltage, supplied to the storage device, to another source voltage level; and a read/write inhibition unit for inhibiting the control unit of the storage device from controlling the read/write operation of the read/write mechanism when the switching from one source voltage level to another source voltage level is detected as being in progress, so that the controlling of the read/write mechanism is withheld until the end of the switching.

According to the present invention, when the switching of the source voltage level is detected as being in progress, the control unit is reset to the initial condition or the controlling of the read/write mechanism by the control unit is inhibited. Thus, the consumption power can be reduced because the switching of the source voltage to the storage device is effectively carried out without raising an undesired problem. Also, it is possible to prevent the contents of the memory of the storage device from being changed at random due to noises during and after the switching of the source voltage level. Further, it is possible to realize a safe and stable operation of the read/write mechanism even when the switching of the source voltage is done.

BRIEF DESCRIPTION OF THE DRAWINGS

The above and other objects, features and advantages of the present invention will be more apparent from the following detailed description when read in conjunction with the accompanying drawings in which:

FIG. 1A is a block diagram of a storage device in one embodiment of the present invention.

FIG. 7 is a block diagram of a recording/reproducing system to which one embodiment of the present invention is applied;

FIG. 8 is a block diagram of a reset signal generating circuit of a host computer;

FIG. 9A is a block diagram of a storage device in one embodiment of the present invention.

FIG. 20 is a circuit diagram of a consumption power detecting circuit of the storage device in FIG. 19;

FIG. 25 is a block diagram of a recording/reproducing system to which one embodiment of the present invention is applied.

DESCRIPTION OF THE PREFERRED EMBODIMENTS

Figure 1B:
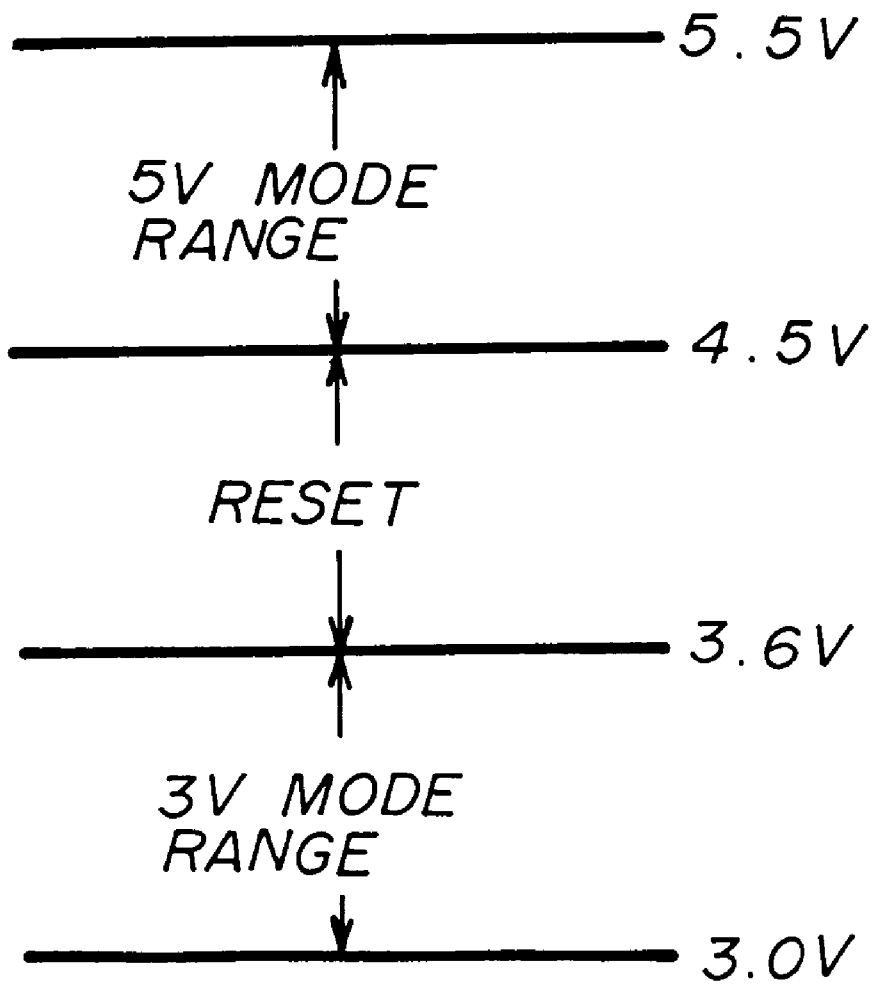
FIG. 1B is a diagram for explaining a source voltage detection of the storage device.

A description will now be given of storage devices and recording/reproducing systems in various embodiments of the present invention with reference to the accompanying drawings.

FIG. 1A shows a storage device 11 in one embodiment of the present invention. This storage device may be a magnetic disk device or an optical disk device. The storage device 11 is connected to a host system such as a host computer, and one of plural source power level from the host system is selectively supplied to operate the storage device 11. In order to reduce a consumption power, the host system selectively supplies one of two source voltages (e.g., 3 V and 5 V) to the storage device 11.

In FIG. 1A, the source power (either 3 V or 5 V) from the host system is supplied to a voltage detecting circuit 12 and other component parts of the storage device 11. The voltage detecting circuit 12 detects whether the source voltage supplied from the host system is within a 3-volt mode range or within a 5-volt mode range. The result of the detection from the voltage detecting circuit 12 is supplied to a control unit 13 including a microcomputer, and input to a reset circuit 14.

FIG. 1B shows a source voltage monitoring of the storage device in FIG. 1A.

When the switching from one of the source voltages to another source voltage is carried out, the voltage detecting circuit 12 outputs a first source voltage signal to the control unit 13 when the source voltage from the host system is within a 3-volt mode range from 3.0 V to 3.6 V. Thus, the first source voltage signal, output to the control unit 13, indicates that the source voltage supplied to the storage device 11 is above 3.0 V and below 3.6 V. The voltage detecting circuit 12 outputs a second source voltage signal to the control unit 13 when the source voltage is within a 5-volt mode range from 4.5 V to 5.5 V. Thus, the second source voltage signal, output to the control unit 13, indicates that the source voltage supplied to the storage device 11 is above 4.5 V and below 5.5 V. The reset circuit 14 outputs a reset signal to the control unit 13 when the source voltage is detected to be within an intermediate range from 3.6 V to 4.5 V. In other words, when the source voltage is neither within the 3-volt mode range nor within the 5-volt mode range, the reset signal is output from the reset circuit 14 to the control unit 13. The voltage detecting circuit 12 at this time outputs no detection signal to the control unit 13.

The control unit 13 is connected to a memory unit 15 including a ROM (read-only memory). In this memory unit 15, a 3-volt mode control data map and a 5-volt mode control data map are stored. These control maps are in the form of a table representing a relationship of seek speed values vs. source current values, the seek speed values being related to, for example, a VCM (voice coil motor) seek speed. The 3-volt mode control data map contains a set of seek speed values and a related set of source current values when the source voltage is within the 3-volt mode range. Similarly, the 5-volt mode control data map contains a set of seek speed values and a related set of source current values when the source voltage is within the 5-volt mode range.

The control unit 13 is connected to a mechanism I/F (interface) unit 16, and this mechanism I/F unit includes motor drivers. The mechanism I/F unit 16 is connected to a mechanism 17, and this mechanism 17 includes a VCM 17a (the voice coil motor) which moves a head in relation to a disk (the recording medium) in its radial direction to locate one of the tracks of the disk upon a seeking action, and a SPM 17b (the spindle motor) which rotates the disk during the data writing or reading. A read/write operation of the mechanism 17 is controlled by the control unit 13 through the mechanism I/F unit 16. The mechanism I/F unit 16 and the mechanism 17 form a read/write mechanism which carries out data recording and reproducing with a recording medium.

Figure 2:
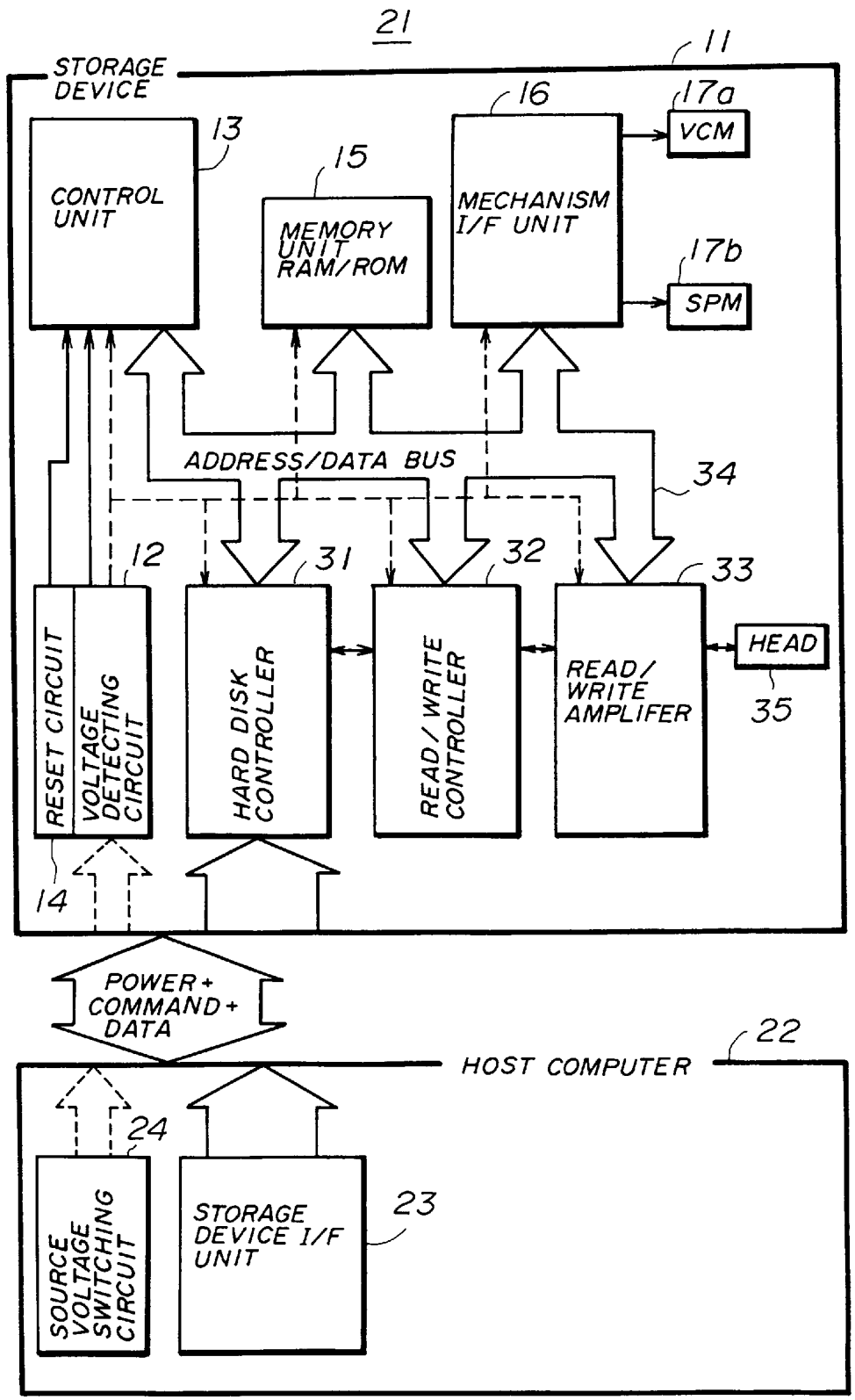
FIG. 2 is a block diagram of a recording/reproducing system to which one embodiment of the present invention is applied.

FIG. 2 shows a recording/reproducing system 21 to which one embodiment of the present invention is applied. In FIG. 2, the storage device 11 and a host computer 22 are connected to each other, and they form the recording/reproducing system 21. Power, control signals and data signals are transferred from the host computer 22 to the storage device 11. Solid lines in FIG. 2 indicate control signal paths through which the control signals from the voltage detecting circuit 12 and the reset circuit 14 are transferred to the control unit 13, and dotted lines in FIG. 2 indicate source power paths through which the source power from the host computer 22 are supplied to the respective parts of the storage device 11.

The storage device 11 includes the control unit 13, the memory unit 15, the mechanism I/F unit 16, a hard disk controller 31, a read/write controller 32, and a read/write amplifier 33. These parts are interconnected by an address/data bus 34, and address/data signals are transferred to the respective parts of the storage device 11 through the address/data bus 34. The source power from the host computer 22 is supplied to the voltage detecting circuit 12, and it is allocated from the voltage detecting circuit 12 to the above-mentioned parts via the source power paths described above.

Further, signals are sent or received between the hard disk controller 31, the read/write controller 32, and the read/write amplifier 33. The read/write operations of a head 35 in relation to a disk within the storage device 11 are carried out through the read/write amplifier 33 under the control of the control unit 13. The mechanism I/F unit 16 is connected to the VCM 17a and the SPM 17b. The drive operations of the VCM 17a and the SPM 17b are carried out under the control of the control unit 13 through the mechanism I/F unit 16.

The reset circuit 14 is coupled to the voltage detecting circuit 12 and outputs a reset signal to the control unit 13 when the voltage level of the source voltage from the host computer 22 is detected as being in the intermediate range between 3.6 V and 4.5 V.

The host computer 22 mentioned above includes a storage device I/F (interface) unit 23, and control signals and data signals are sent or received between the storage device I/F unit 23 and the hard disk controller 31. In addition, the host computer 22 includes a battery connected to a source voltage switching circuit 24. The battery serves as the power supply of the host computer 22, and a source power from the battery is supplied to the storage device 11. The source voltage switching circuit 24 selectively supplies one of the two source voltages 3 V and 5 V to the storage device 11, in order to reduce a consumption power.

Figure 3A:
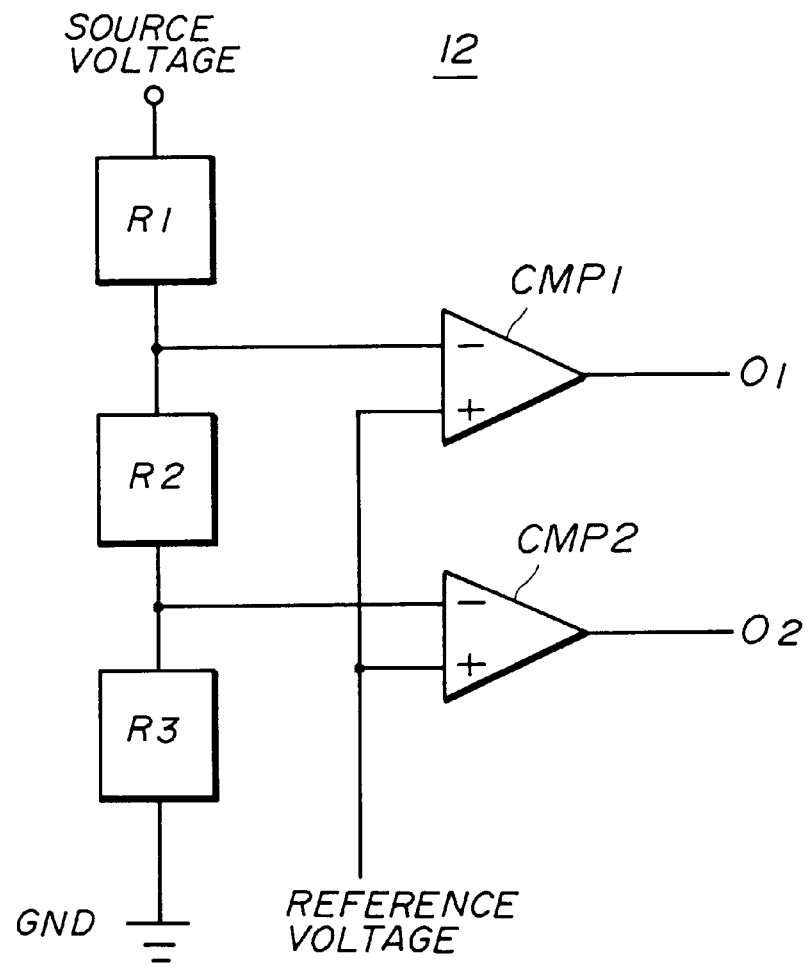
FIG. 3A is a block diagram of a voltage detecting circuit.

FIG. 3A shows a voltage detecting circuit 12 according to one embodiment of the present invention. In FIG. 3A, the voltage detecting circuit 12 has a grounded terminal, an input terminal, and two output terminals O1 and O2. The source voltage from the host system is applied to the input terminal. The voltage detecting circuit 12 includes resistors R1, R2 and R3 which are connected in series between the input terminal and the grounded terminal.

The voltage detecting circuit 12 further includes a comparator CMP1 and a comparator CMP2. A divided voltage of the source voltage at a connection point between the resistors R1 and R2 is applied to an inverted input (−) of the comparator CMP1. A divided voltage of the source voltage at a connection point between the resistors R2 and R3 is applied to an inverted input (−) of the comparator CMP2. A predetermined reference voltage, generated by a voltage source such as a Zener diode, is applied to each of non-inverted inputs (+) of the comparators CMP1 and CMP2.

The comparator CMP1 and the comparator CMP2 respectively output two-state signals from the terminals O1 and O2 in accordance with the source voltage from the host system. More specifically, in the voltage detecting circuit 12 described above, when two low-level signals are output from the terminals O1 and O2, the source voltage level from the host system is detected as being below 3.6 V. When a low-level signal is output from the terminal O1 and a high-level signal is output from the terminal O2, the source voltage level is detected as being above 3.6 V and below 4.5 V. When two high-level signals are output from the terminals O1 and O2, the source voltage is detected as being above 4.5 V.

If the numbers of resistors and comparators provided in the voltage detecting circuit 12 are increased, it is possible to realize a detection of the source voltage from among four or more ranges. If an analog-to-digital converter is provided in the voltage detecting circuit 12, it is possible to determine a value of the source voltage by converting an analog signal into a digital signal.

Figure 3B:
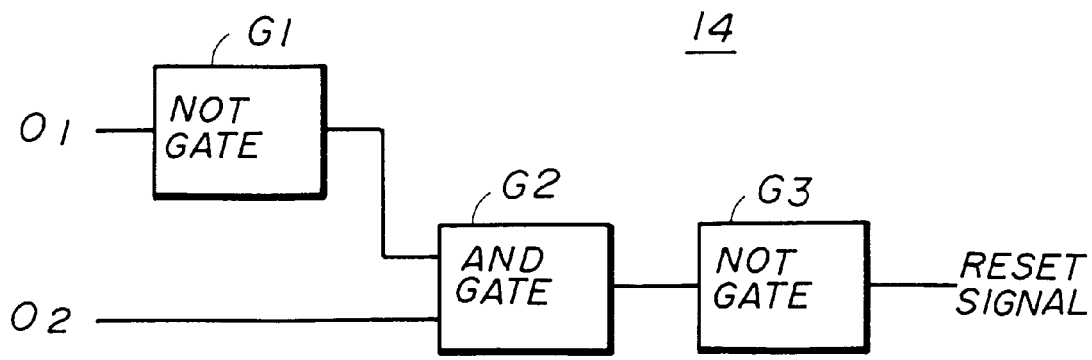
FIG. 3B is a block diagram of a reset circuit.

FIG. 3B shows a reset circuit 14 in one embodiment of the present invention. In FIG. 3B, the reset circuit 14 has two inputs which are connected to the output terminals O1 and O2 of the voltage detecting circuit 12 described above. The reset circuit 12 includes a NOT gate G1, an AND gate G2, and a NOT gate G3.

In FIG. 3B, an output of the comparator CMP1 from the output terminal O1 is supplied to an input of the NOT gate G1. An output of the NOT gate G1 and an output of the comparator CPM 2 from the output terminal O2 are supplied to inputs of the AND gate G2. An output of the AND gate G2 is supplied to an input of the NOT gate G3.

The reset circuit 14 described above outputs a reset signal to the control unit 13 when a low-level signal is output by the NOT gate G3. More specifically, the NOT gate G3 outputs a low-level signal when a low-level signal output from the comparator CMP1 is input to the NOT gate G1 and a high-level signal output from the comparator CMP2 is input to the AND gate G2. The reset circuit 14 at this time outputs a reset signal to the control unit 13.

Figure 4A:
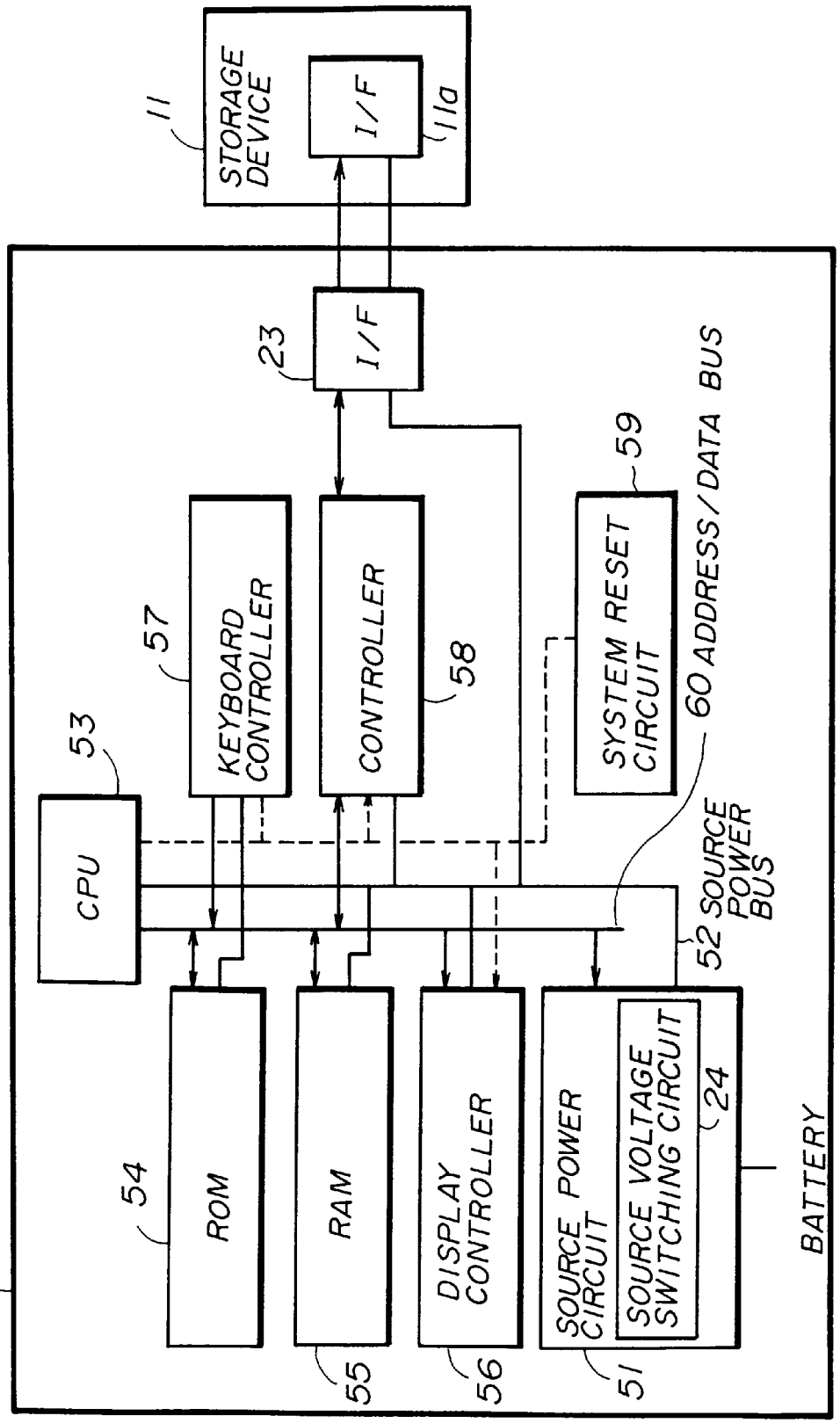
FIG. 4A is a block diagram of a host computer to which one embodiment of the present invention is applied.

FIG. 4A shows a host computer 22 to which one embodiment of the present invention is applied. In FIG. 4A, a battery is connected to a source power circuit 51, and the source power circuit 51 has the source voltage switching circuit 24 described above.

A source power bus 52 extending from the source power circuit 51 is connected to a CPU (central processing unit) 53, a ROM (read-only memory) 54, a RAM (random access memory) 55, a display controller 56, a keyboard controller 57, a controller 58, and the storage device I/F unit 23. The source power from the battery is supplied to these parts via the source power bus 52.

The source power circuit 51, the CPU 53, the ROM 54, the RAM 55, the display controller 56, the keyboard controller 57, and the controller 58 are interconnected by an address/data bus 60. This address/data bus 60 is indicated by a solid line in FIG. 4A. A system reset circuit 59 generates a system reset signal, and the system reset signal output from the system reset circuit 59 is transferred to the CPU 53, the display controller 56, the keyboard controller 57, and the controller 58. The system reset signal path is indicated by a dotted line in FIG. 4A. The controller 58 sends a command and data to the storage device I/F unit 23, and the source power from the battery is supplied to the storage device I/F unit 23. The power and the command and data are transferred from the storage device I/F unit 23 to an I/F (interface) unit 11a of the storage device 11.

The CPU 53 outputs a source voltage switch signal to the source voltage switching circuit 24 of the source power circuit 51 to select one of the two source voltages 3 V and 5 V. The source voltage switching circuit 24 selectively supplies one of the two source powers 3 V and 5 V to the storage device 11 via the storage device I/F unit 23 in accordance with the source voltage switch signal from the CPU 53.

Figure 4B:
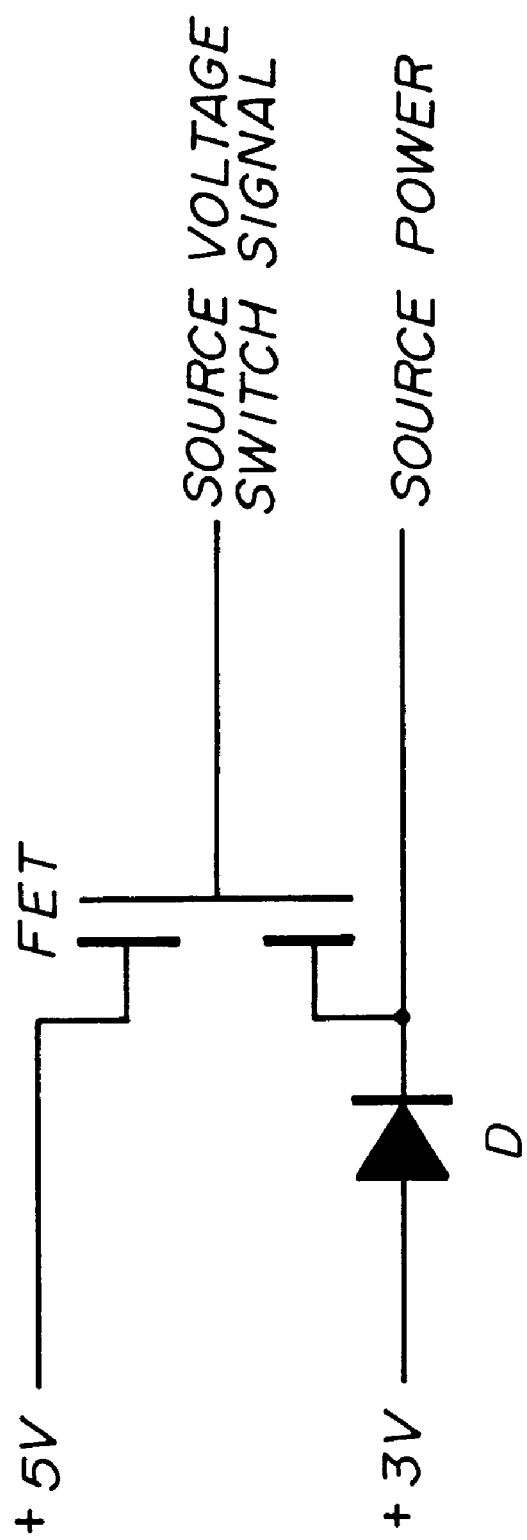
FIG. 4B is a circuit diagram of a source voltage switching circuit.

FIG. 4B shows a source voltage switching circuit 24 of the host computer in FIG. 4A. In FIG. 4B, the source powers 3 V and 5 V are generated by the source power circuit 51, and they are supplied to inputs of the source voltage switching circuit 24. The source voltage switching circuit 24 includes a diode D and a FET (field-effect transistor) as shown in FIG. 4B. The source power 3 V is supplied to an anode of the diode D, and the source power 5 V is supplied to a drain of the FET. The source voltage switch signal from the CPU 53 is input to a gate of the FET. One of the two source powers 3 V and 5 V is selected in accordance with the source voltage switch signal, and the selected source power is output from either a cathode of the diode D or a source of the FET to the storage device I/F unit 23 via the source power bus 52.

The memory unit 15 of the storage device 11 has a RAM (random access memory) area and a ROM (read-only memory) area. In this ROM area of the memory unit 15, 3 V and 5 V mode seek speed maps in the form of seek speed vs. time conversion tables are stored. The seek speed maps mentioned above are shown in FIGS. 5A and 5B.

Figure 5A:
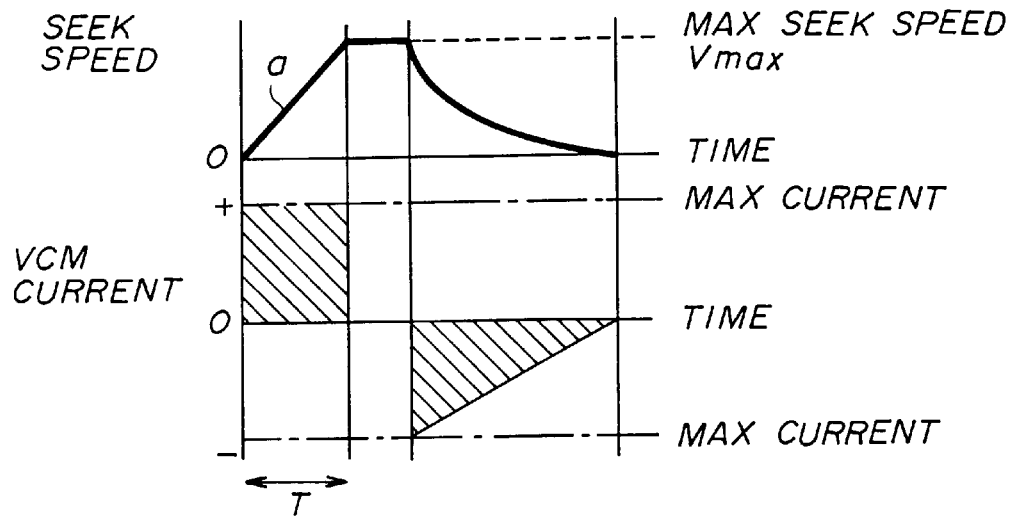
FIGS. 5A and 5B are time charts showing seek speed curves and relevant VCM current changes when the source voltage is 5 V and 3 V, respectively.
Figure 5B:
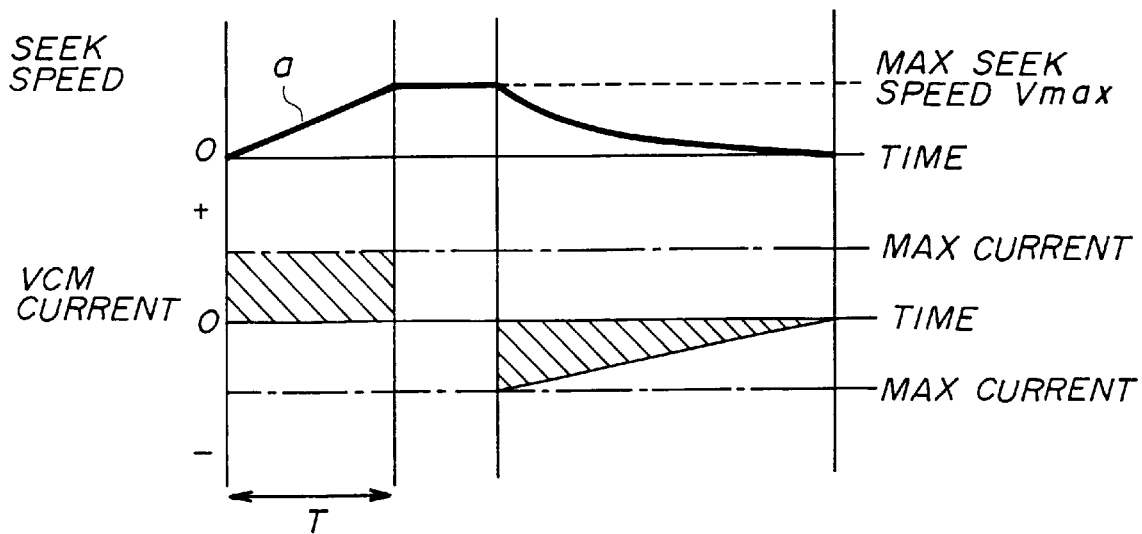

FIG. 5A shows a 5 V mode seek speed map and the relevant VCM current change needed for one seeking operation. FIG. 5B shows a 3 V mode seek speed map and the relevant VCM current change needed for one seeking operation. Regarding the seek speed maps for the 5 V and 3 V modes shown in FIGS. 5A and 5B, a seek distance is the same. As shown, when the source voltage is 5 V, a maximum VCM current is increased so that a maximum seek speed Vmax is relatively high. Thus, in the 5 V mode, the seek time is reduced but the consumption power is increased. When the source voltage is 3 V, the maximum VCM current is reduced so that the maximum seek speed Vmax is relatively low. Thus, in the 3 V mode, the seek time is increased but the consumption power is reduced.

The maximum seek speed Vmax is represented by the product of acceleration "a" and seek time "T", that is, Vmax=a·T. The acceleration "a" mentioned above is the rate of change of the seek speed with respect to time from zero to the maximum seek speed Vmax. The seek time "T" is a time period needed to reach the maximum seek speed.

In one embodiment of the present invention, the maximum current values for the 3 V and 5 V modes are predetermined. As the maximum current and the source voltage are in proportion, the acceleration and the source voltage are also in proportion. The seek speed maps are prepared based on acceleration values ("a") and maximum seek speed values ("a.T") and based on linear interpolated results of the acceleration values and the maximum seek speed values. The acceleration values "a" and the maximum seek speed values "a.T" at equally divided parts of a given seek distance for the 3 V and 5 V modes can be calculated through linear interpolation, and the 3 V and 5 V mode seek speed maps are thus prepared.

As shown in FIG. 1B, when the source voltage from the host computer 22 is detected as being between 4.5 V and 5.5 V, the control unit 13 retrieves the 5 V mode seek speed map from the memory unit 15. When the source voltage from the host computer 22 is detected as being between 3.0 V and 3.6 V, the control unit 13 retrieves the 3 V mode seek speed map from the memory unit 15. A read/write operation of the mechanism 17 is controlled by the control unit 13 through the mechanism I/F unit 16 in accordance with the selected control data.

Figure 6:
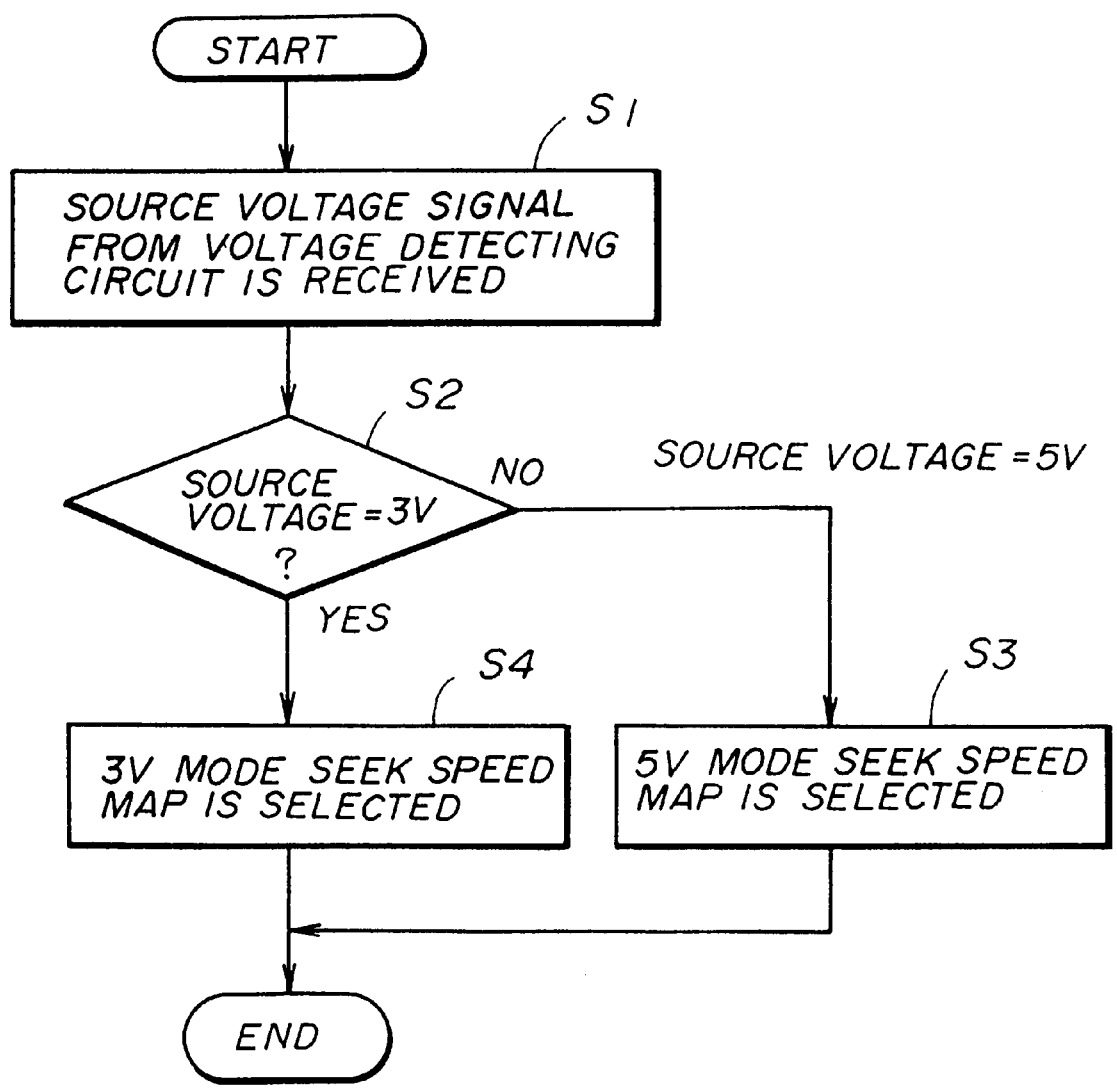
FIG. 6 is a flow chart for explaining a seek speed curve determination procedure performed in accordance with a source voltage.

FIG. 6 shows a seek control data determination procedure performed by the storage device in accordance with the source voltage from the host computer. The control unit 13 of the storage device 11, at step S1 in FIG. 6, receives a source voltage signal from the voltage detecting circuit 12. As described above, the voltage detecting circuit 12 outputs to the control unit 13 a signal indicating the source voltage from the host computer 22. Step S2 detects whether the source voltage from the host computer 22 is 3 V, based on the received source voltage signal.

If the result at step S2 is negative, it is determined that the source voltage from the host computer 22 is 5 V. Step S3 selects a 5 V mode seek speed map from the maps stored in the memory unit 15.

If the result at step S2 is affirmative, it is determined that the source voltage from the host computer 22 is 3 V. Step S4 selects a 3 V mode seek speed map from the maps stored in the memory unit 15.

Thus, the control unit 13 controls a read/write operation of the mechanism 17 through the mechanism I/F unit 16 in accordance with the selected seek control data.

In the above recording/reproducing system 21 in FIG. 2, the source voltage switching circuit 24 supplies a 5 V source power to the storage device 11 when the host computer 22 is powered on or reset to the initial condition. The source voltage from the host computer 22 is detected as being 5 V by the voltage detecting circuit 12 of the storage device 11. The result of the detection is sent from the voltage detecting circuit 12 to the control unit 13. The control unit 13 retrieves the 5 V mode seek speed map from the memory unit 15, and controls a seeking operation of the mechanism 17 (or the VCM 17a) through the mechanism I/F unit 16 in accordance with the retrieved control data.

The host computer 22 checks the device type of the storage device 11 when it is powered on, in order to detect whether the storage device 11 is capable of performing only the 5 V mode operation or both the 3 V and 5 V mode operations. When the storage device 11 is detected as being capable of performing the 3 V mode operation, the source voltage switching circuit 24 switches the 5 V source power, supplied to the storage device 11, to a 3 V source power.

In one embodiment of the present invention, when the source voltage from the host computer 22 is detected as being below 4.5 V because of the switching of the source voltage, the reset circuit 14 outputs a reset signal to the control unit 13. The control unit 13 at this time is reset to the initial condition which is a condition in which the control unit 13 of the storage device 11 is placed immediately after it is powered on. Once the source voltage from the host computer 22 is detected as being below 3.6 V (and above 3.0 V), the resetting of the control unit 13 is canceled and the storage device 11 is placed in a waiting condition until the receipt of a next command. Thus, the reset circuit 14 resets the control unit 13 to the initial condition when the switching from one of the source voltages to another source voltage is detected as being in process, so that the controlling of the read/write mechanism is withheld until the end of the switching.

FIG. 7 shows a recording/reproducing system 21 to which one embodiment of the present invention is applied. In FIG. 7, a source voltage switching circuit 24 and a reset circuit 25 are provided within the host computer 22. The source voltage switching circuit 24 switches one of the source voltages, supplied to the storage device 11, to another source voltage. When the switching is carried out by the source voltage switching circuit 24, the reset circuit 25 outputs a reset signal to the control unit 13 of the storage device 11. The control unit 13 is reset to the initial condition during the switching of the source voltage. After the switching of the source voltage is done, the resetting of the control unit 13 is canceled and the storage device 11 is placed in a waiting condition. Thus, a safe, stable operation of the read/write mechanism during and after the switching of the source voltage is realized by the host computer 22.

FIG. 8 shows a reset signal generating circuit of a host computer. In FIG. 8, the host computer 22 includes the CPU 53, the controller 58 and the I/F unit 23, which are the same as those of the host computer 22 in FIG. 4A. An output of the controller 58 is connected to one input of an OR gate G4. An output of the system reset circuit 59 (not shown in FIG. 8) is connected to the other input of the OR gate G4. An output of the OR gate G4 is connected to an input of the I/F unit 23.

When the switching of the source voltage is carried out by the source voltage switching circuit 24, the CPU 53 loads a reset program from the control programs stored in the ROM 54, and generates a reset signal in accordance with the reset program. The reset signal is transferred from the controller 58 to the I/F unit 23 via the OR gate G4. The reset signal from the I/F unit 23 is further transferred to the control unit 13 of the storage device 11.

A system reset signal is also supplied to the OR gate G4 when it is output from the system reset circuit 59. Thus, when either the reset signal from the CPU 53 or the system reset signal from the system reset circuit 59 is input to the OR gate G4, the reset signal is supplied from the OR gate G4 to the I/F unit 23.

Figure 9B:
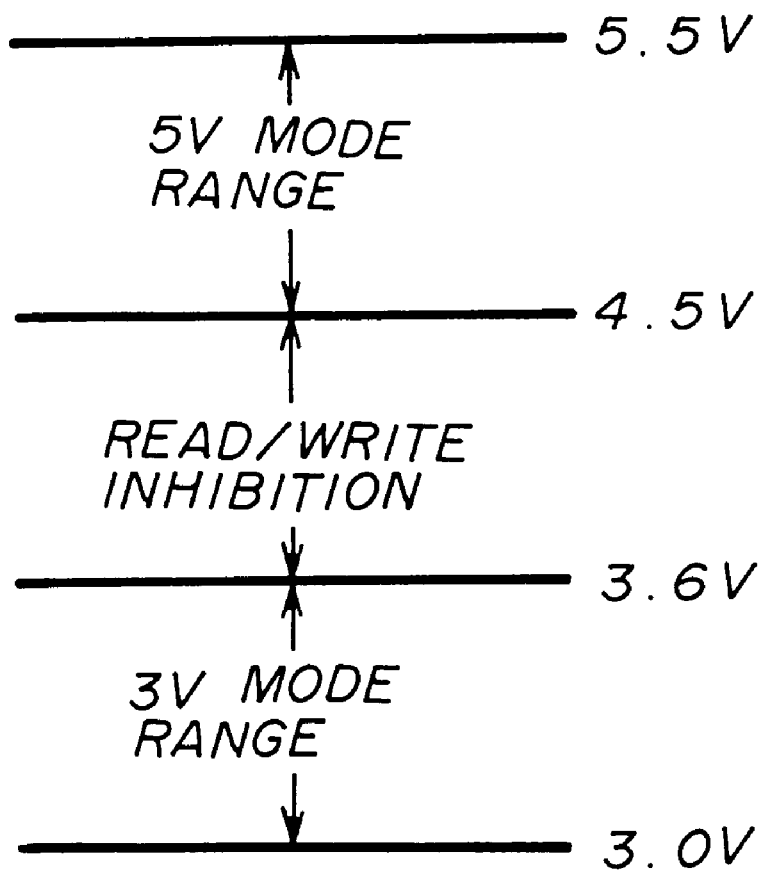
FIG. 9B is a diagram for explaining a source voltage monitoring of the storage device.

FIG. 9A shows a storage device in one embodiment of the present invention, and FIG. 9B shows a source voltage monitoring of the storage device in FIG. 9A. In FIG. 9A, a read/write inhibition circuit 36 is coupled to the voltage detecting circuit 12, and an output of the read/write inhibition circuit 36 is connected to an input of the control unit 13.

When the source voltage from the host computer 22 is detected as being below 4.5 V by the voltage detecting circuit 12 because of the switching of the source voltage, the read/write inhibition circuit 36 outputs a read/write inhibit signal to the control unit 13. As shown in FIG. 9B, the control unit 13 at this time is inhibited from controlling a read/write operation of the mechanism 17 to read data from or write data onto the disk within the storage device 11. Once the source voltage from the host computer 22 is detected as being below 3.6 V (and above 3.0 V) by the voltage detecting circuit 12, the inhibition of the controlling of the control unit 13 is canceled and the storage device 11 is placed in a waiting condition until the receipt of a next command. Thus, the read/write inhibition circuit 36 inhibits the controlling of the control unit 13 when the switching from one of the source voltages to another source voltage is detected as being in process, so that the controlling of the read/write mechanism is withheld until the end of the switching.

Figure 10:
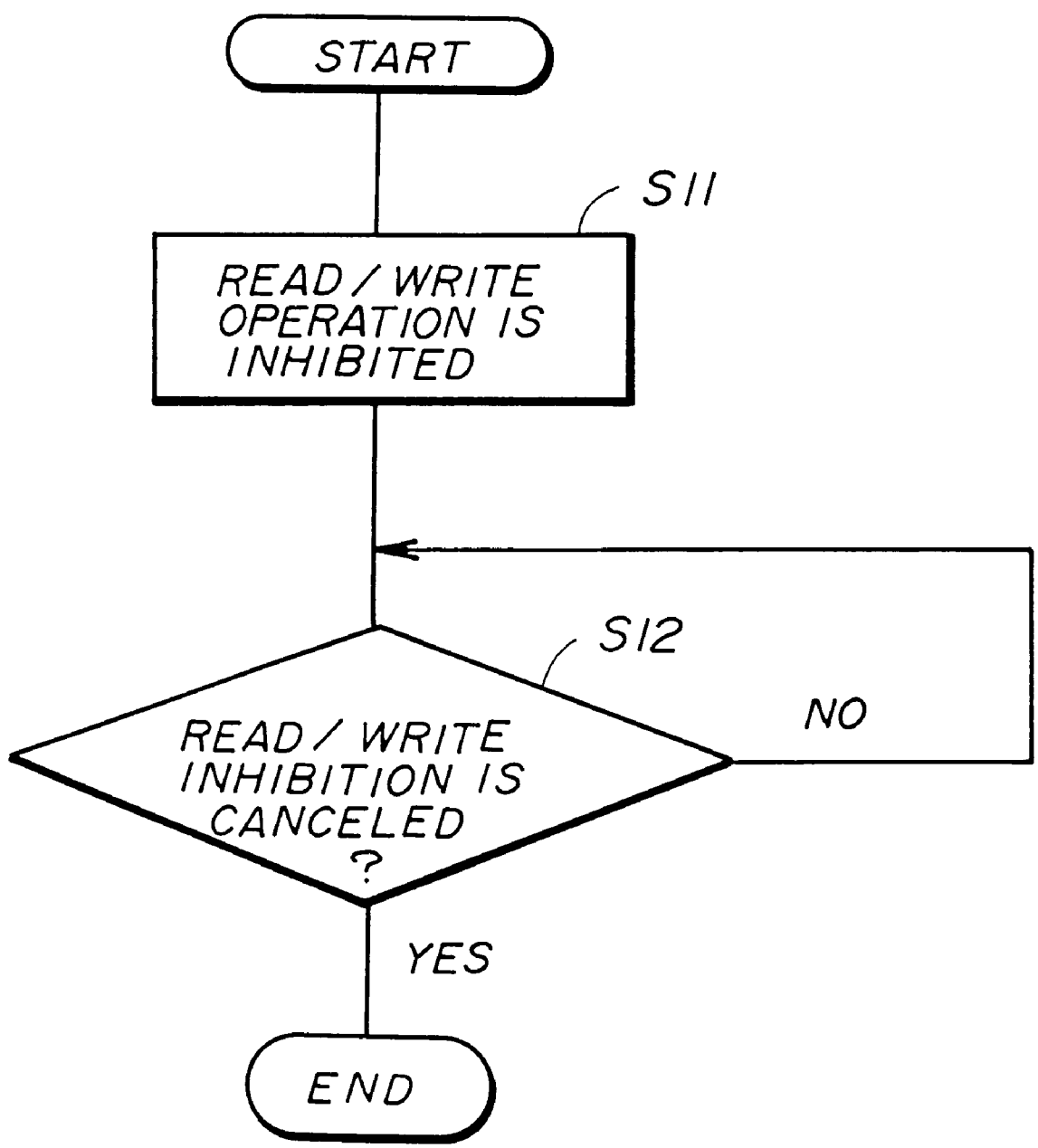
FIG. 10 is a flow chart for explaining a read/write inhibition of the storage device.

FIG. 10 shows a read/write operation inhibition procedure of the storage device in FIG. 9A. When the source voltage from the host computer 22 is detected as being below 4.5 V by the voltage detecting circuit 12 in FIG. 3A, the signals from the outputs O1 and O2 of the voltage detecting circuit 12 are supplied to the read/write inhibition circuit 36. The read/write inhibition circuit 36 at this time outputs a low-level signal to the control unit 13. As this read/write inhibit signal is received by the control unit 13, the read/write operation of the mechanism 17 is inhibited at step S1 in FIG. 10. However, the control unit 13 controls the operation of the VCM 17a and the SPM 17b in the normal manner.

The control unit 13, at step S12 in FIG. 10, detects whether the inhibition of the read/write operation is canceled based on whether the source voltage from the host computer 22 is detected as being below 3.6 V by the voltage detecting circuit 12. Thus, the read/write inhibition circuit 36 inhibits the controlling of the control unit 13 when the switching from one of the source voltages to another source voltage is detected as being in process, so that the read/write operation of the mechanism 17 is withheld until the end of the switching.

According to the present invention, the consumption power can be reduced because the switching of the source voltage from the host computer is effectively carried out. Also, it is possible to prevent the content of the memory of the storage device from being changed at random due to noises during and after the switching of the source voltage. Further, it is possible to realize a safe and stable operation of the read/write mechanism even when the switching of the source voltage is done.

Figure 11:
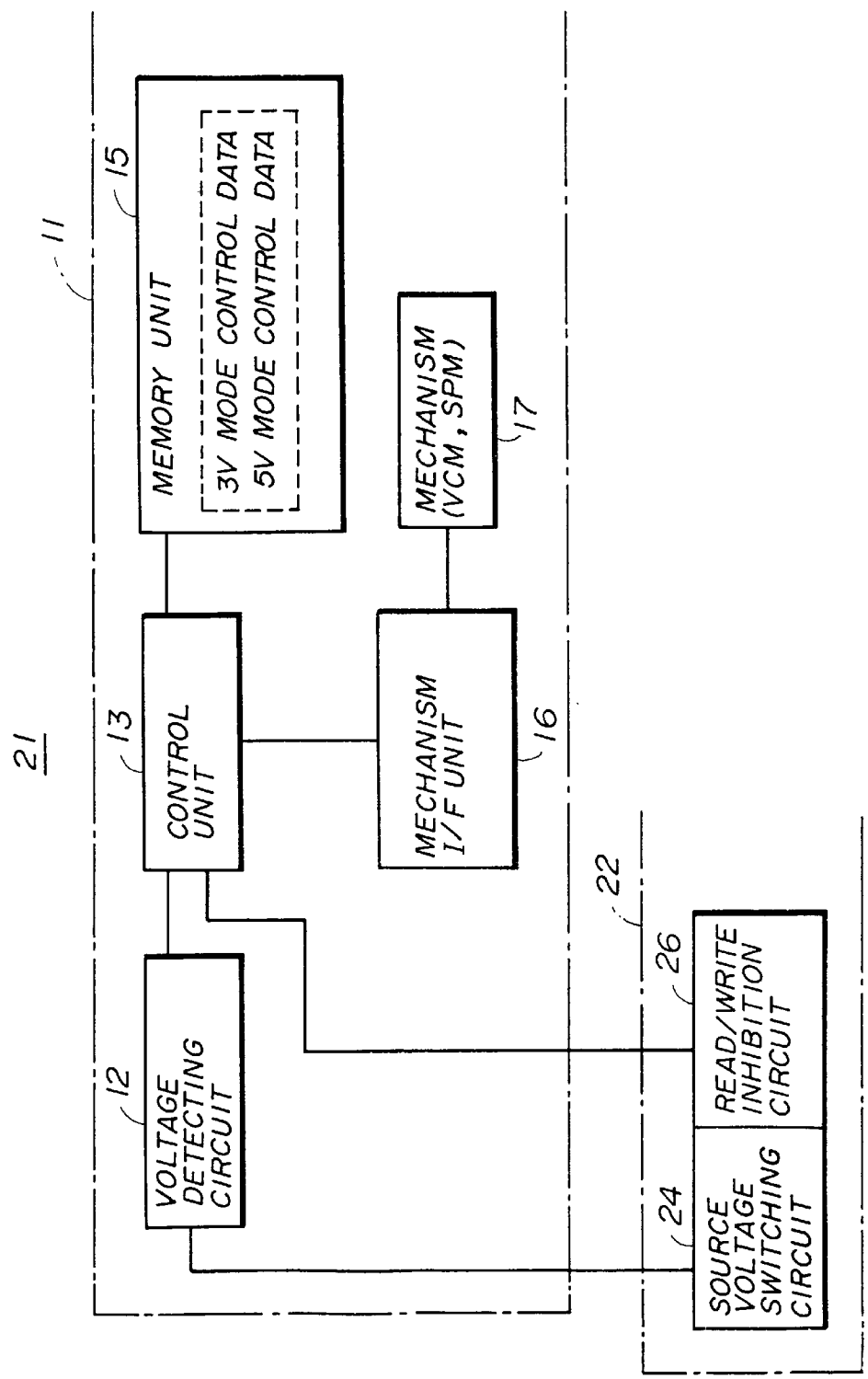
FIG. 11 is a block diagram of a storage device in one embodiment of the present invention, which is provided within a recording/reproducing system.

FIG. 11 shows a recording/reproducing system 21 to which one embodiment of the present invention is applied. In FIG. 11, the reset circuit 25 of the host computer 22 in FIG. 7 is replaced with a read/write inhibition circuit 26, and the other parts of the recording/reproducing system 21 are the same as corresponding parts of the recording/reproducing system in FIG. 7.

In the recording/reproducing system 21 described above, when the switching of the source voltage from the host computer 22 is carried out by the source voltage switching circuit 24, the voltage detecting circuit 12 of the storage device 11 detects whether the switching of the source voltage is in progress. When the switching of the source voltage is detected as being in progress, the read/write inhibition circuit 26 outputs a read/write inhibit signal to the control unit 13 of the storage device 11. The controlling of the control unit 13 for the read/write operation of the mechanism 17 is thus inhibited. When the switching of the source voltage is detected as being done, the read/write inhibition circuit 26 no longer outputs the read/write inhibit signal to the control unit 13. The read/write inhibition is canceled and the normal operation of the storage device 11 is restarted. Accordingly, a safe, stable operation of the mechanism 17 during and after the switching of the source voltage is realized.

Figure 12:
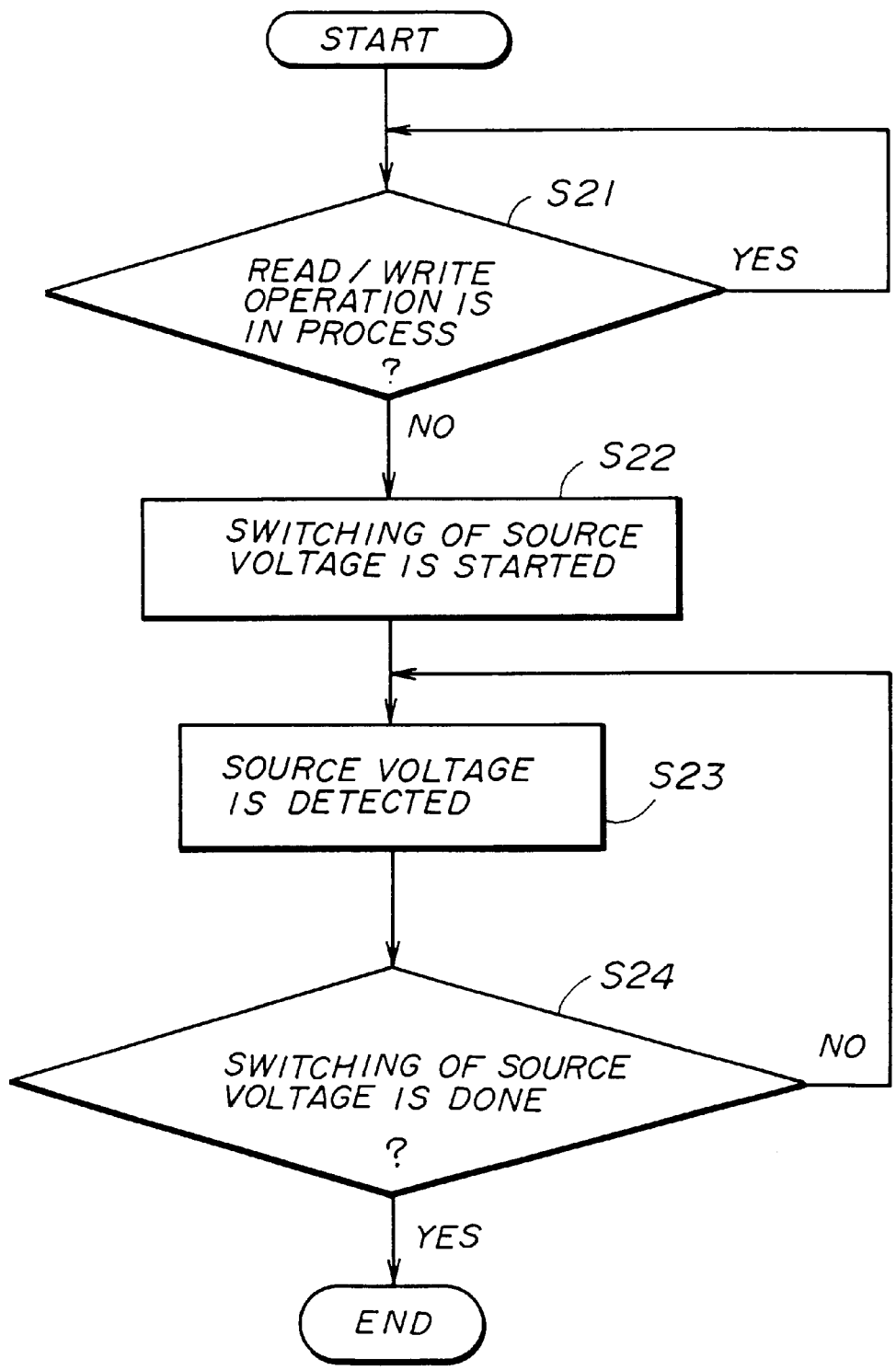
FIG. 12 is a flow chart for explaining a read/write inhibition of the host computer.

FIG. 12 shows a read/write inhibition procedure of the recording/reproducing system in FIG. 11. The read/write inhibition is primarily carried out by the host computer 22 in FIG. 11.

The CPU 53 of the host computer 22, at step S21 in FIG. 12, detects whether the read/write operation by the storage device 11 is in process. If the rest at step S21 is affirmative, the read/write inhibition procedure is not started. If the read/write operation is detected as being in process, step S22 controls the source voltage switching circuit 24 to start the switching of the source voltage, supplied to the storage device 11. When the source voltage supplied to the storage device 11 is between 4.5 V and 3.6 V, the read/write inhibition circuit 26 outputs a read/write inhibit signal to the control unit 13 of the storage device 11.

In this embodiment, the read/write inhibition circuit 26 inhibits the controlling of the control unit 13 when the switching from one of the source voltages to another source voltage is detected as being in process, so that the read/write operation of the mechanism 17 is withheld until the end of the switching.

The voltage detecting circuit 12 of the storage device 11, at step S23, detects whether the switching of the source voltage from the host computer 22 is in process. The source voltage signal from the voltage detecting circuit 12 is supplied to the control unit 13. The control unit 13, at step S24, detects whether the switching of the source voltage is done, based on the received source voltage signal. When the end of the switching of the source voltage is detected, the read/write inhibition is canceled and the normal operation of the storage device 11 is restarted. The read/write inhibit signal is no longer output by the read/write inhibition circuit 26.

Figure 13:
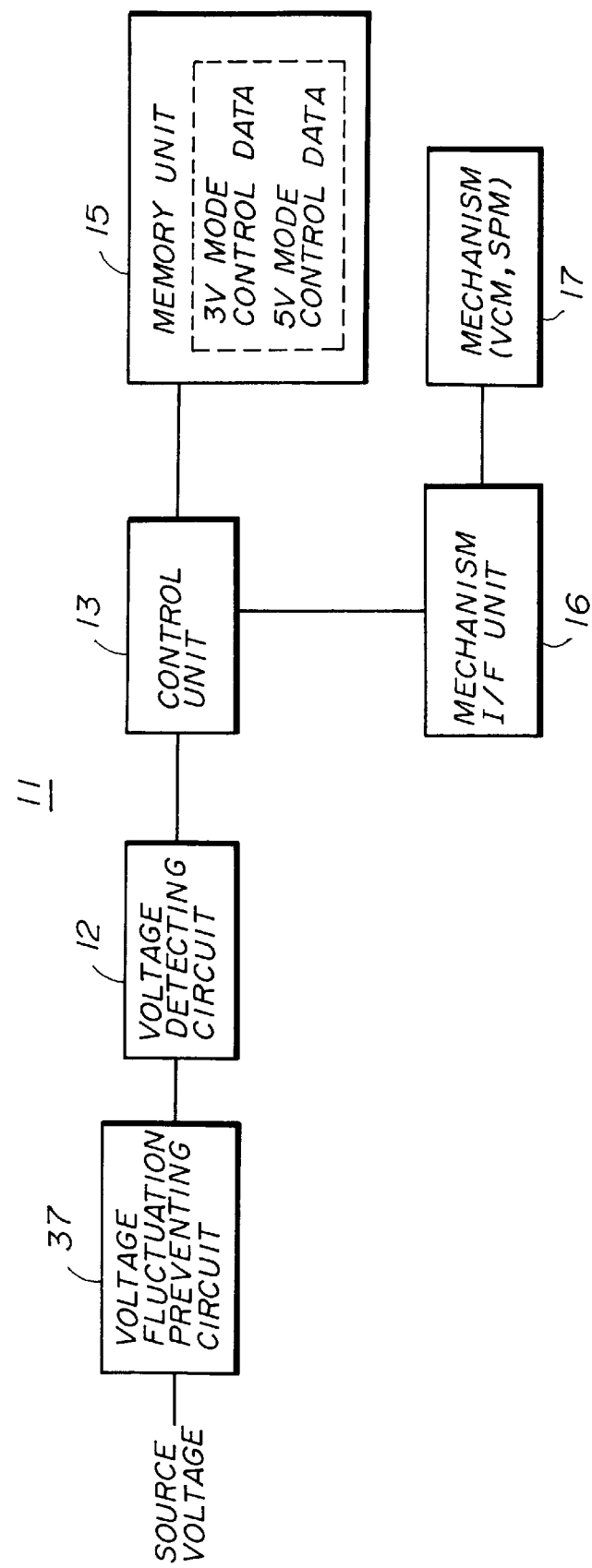
FIG. 13 is a block diagram of a storage device in one embodiment of the present invention.

FIG. 13 shows a storage device 11 in one embodiment of the present invention. In FIG. 13, a voltage fluctuation preventing circuit 37 is provided within the storage device 11. One of the source voltages from the host computer is selectively supplied to the voltage detecting circuit 12 via this voltage fluctuation preventing circuit 37. The result of the detection by the voltage detecting circuit 12 is supplied to the control unit 13. The other parts of the storage device 11 in FIG. 13 are the same as corresponding parts of the storage device in FIG. 1A.

Figure 14:
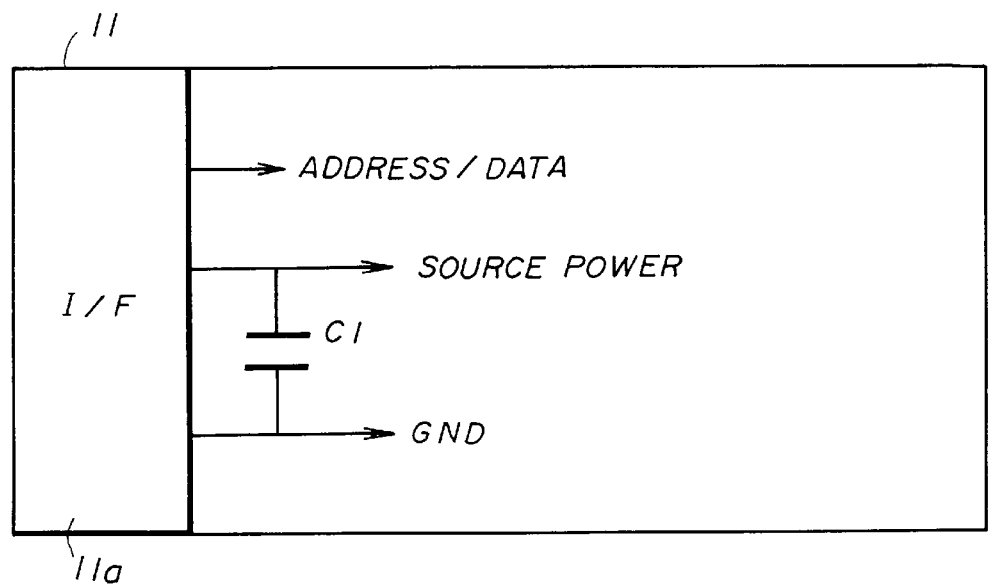
FIG. 14 is a diagram of a voltage fluctuation preventing circuit of the storage device in FIG. 13.

FIG. 14 shows a voltage fluctuation preventing circuit 37 of the storage device in FIG. 13. In FIG. 14, a capacitor C1 having a relatively great capacitance is connected between a power line and a grounded line of the I/F unit 11a of the storage device 11. This voltage fluctuation circuit 37 restricts a rate of change of the source voltage, supplied from the host computer 22, below a predetermined rate of change (e.g., 1.0 V per second) when the switching of the source voltage is carried out. The predetermined rate of change in this embodiment depends on the capacitance of the capacitor C1.

The control unit 13 of the storage device in FIG. 13 controls a read/write operation of the mechanism 17 in accordance with the source voltage whose rate of change is restricted by the voltage fluctuation preventing circuit 37. In this embodiment, the rate of change of the source voltage, supplied to the storage device 11, is restricted by the source voltage fluctuation circuit 37 even when the switching of the source voltage is carried out. Thus, it is possible to prevent the content of the memory of the storage device 11 from being changed at random due to noises during and after the switching of the source voltage.

Figure 15:
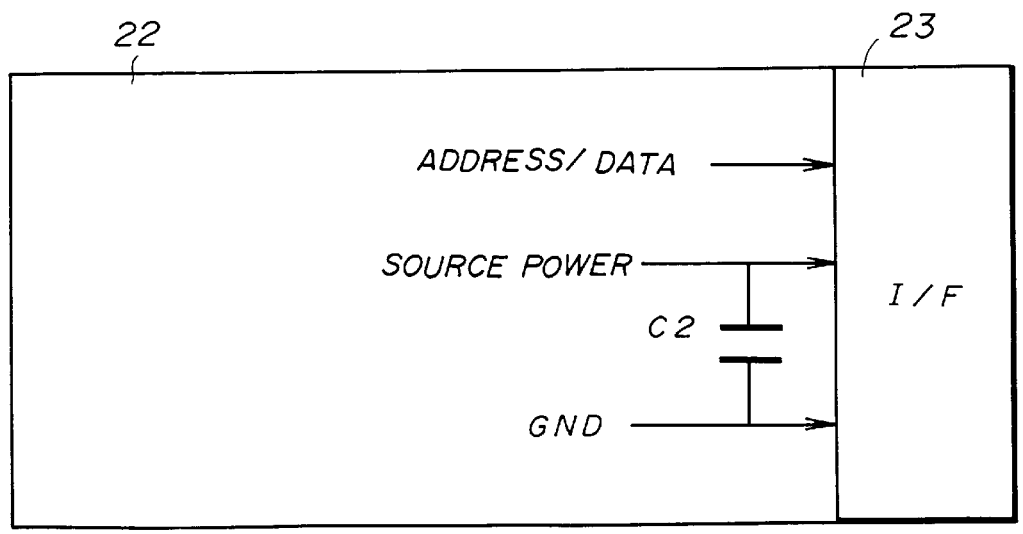
FIG. 15 is a diagram of a voltage fluctuation preventing circuit provided within a host computer.

FIG. 15 shows a voltage fluctuation preventing circuit of the host computer. In FIG. 15, a capacitor C2 having a relatively great capacitance is connected between a source power line and a grounded line of the storage device I/F unit 23 of the host computer 22. The features and advantages of the voltage fluctuation preventing circuit in FIG. 15 are the same as those of the voltage fluctuation preventing circuit in FIG. 14.

Figure 16:
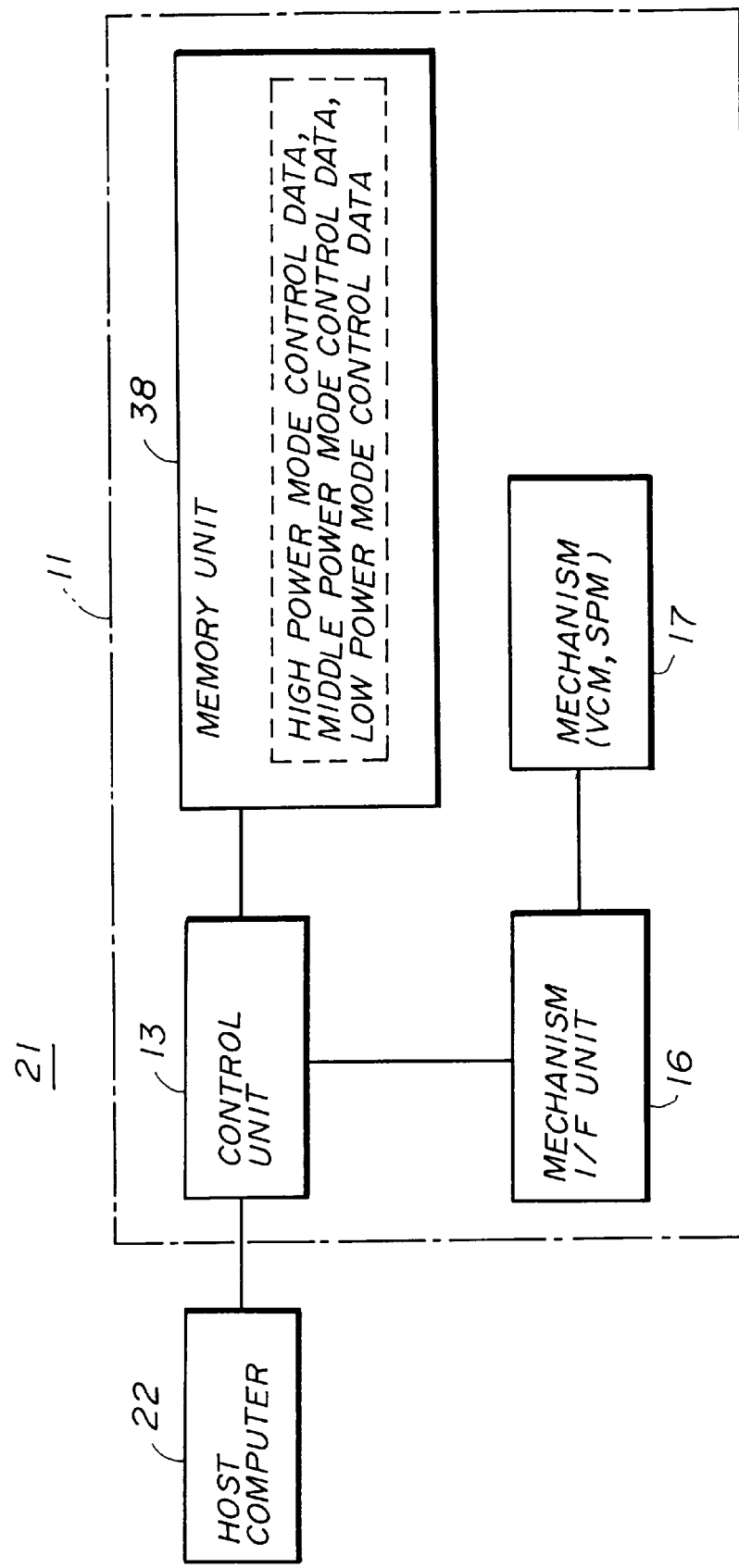
FIG. 16 is a block diagram of a recording/reproducing system in which one embodiment of the present invention is applied.

FIG. 16 shows a recording/reproducing system 21 to which one embodiment of the present invention is applied. In FIG. 16, the recording/reproducing system 21 includes a memory unit 38 in which sets of control data related to a high power mode, a middle power mode, and a low power mode of the mechanism 17 are stored. The sets of control data stored in the memory unit 38 include a plurality of seek speed maps related to the respective operation modes of the mechanism 17. The other parts of the recording/reproducing system 21 in FIG. 16 are the same as corresponding parts of the recording/reproducing system in FIG. 11.

The mechanism 17 is actuated in accordance with one of the sets of control data related to a specified one of the operation modes of the mechanism 17, so that a read/write operation is carried out to read data from or write data onto the disk within the storage device 11.

The control unit 13 in FIG. 16 recognizes an operation mode specified by the host computer 22 by detecting a source voltage from the host computer 22, and retrieves one of the sets of control data from the memory unit 38 in accordance with the specified mode. Thus, the control unit 13 controls a read/write operation of the mechanism 17 through the mechanism I/F unit 16 in accordance with the retrieved control data.

Figure 17:
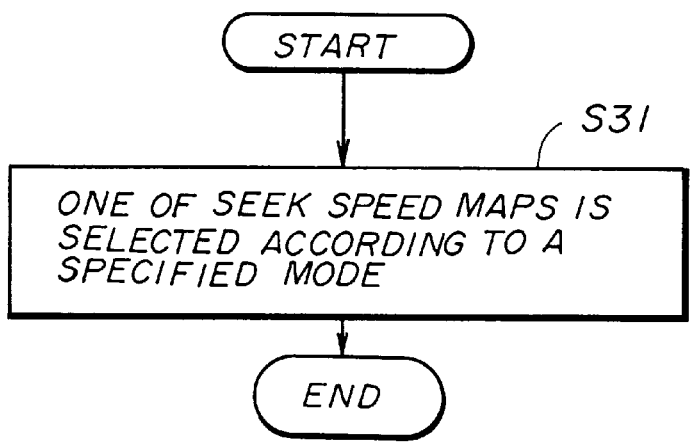
FIG. 17 is a flow chart for explaining a seek speed curve determination procedure performed in accordance with a specified mode.

FIG. 17 shows a seek control data determination procedure performed in accordance with a specified mode. The control unit 13 of the storage device 11, at step S31 in FIG. 17, selects one of the seek speed maps related to the respective operation modes, stored in the memory unit 38, in accordance with the operation mode specified by the host computer 22. The control unit 13 controls a read/write operation of the mechanism 17 through the storage device I/F unit 16 in accordance with the selected seek speed map.

The host computer 22 may specify either a quantity of an applicable source power or one of the operation modes related to the storage device 11. When the quantity of the applicable source power is specified by the host computer, the control unit 13 selects one of the control data related to the operation mode nearest to the specified source power quantity. The control unit 13 does not respond when a quantity of a source power that cannot be used by the storage device 11 is specified by the host computer 22.

When one of the operation modes related to the storage device 11 is specified, the control unit 13 selects one of the control data related to the specified mode, and controls a read/write operation of the mechanism 17 through the storage device I/F unit 16 in accordance with the selected control data. For example, when the high power mode is selected, the seek speed of the mechanism 17 is increased and the consumption power is the highest. When the low power mode is selected, the seek speed of the mechanism 17 is reduced and the consumption power is the lowest.

Figure 18:
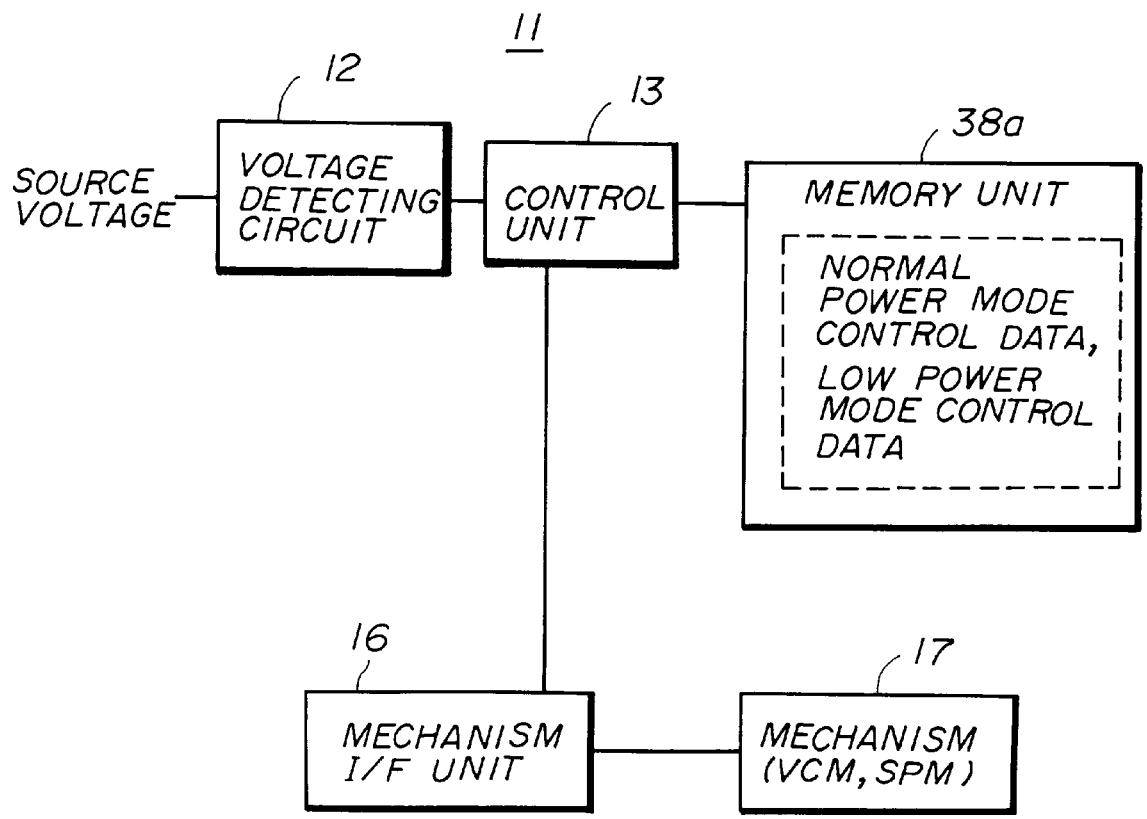
FIG. 18 is a block diagram of a storage device in one embodiment of the present invention.

FIG. 18 shows a storage device 11 in one embodiment of the present invention. In FIG. 18, the storage device 11 includes the voltage detecting circuit 12, the control unit 13, the mechanism I/F unit 16, and the mechanism 17, which are the same as those of the storage device shown in FIG. 1. Apart from those shown in FIG. 1, in the storage device 11 in FIG. 18, the reset circuit 14 is omitted therein and the memory unit 15 is replaced with a memory unit 38a.

In the memory unit 38a in FIG. 18, a set of normal power mode control data and a set of low power mode control data are stored. The sets of the control data stored in the memory unit 38a are seek speed curves, for example, which are described above with the memory unit 15 in FIG. 1.

In FIG. 18, the read/write mechanism is actuated in accordance with one of the sets of control data related to a specified one of the power consumption modes, so that a read/write operation is carried out to read data from or write data onto the recording medium within the storage device 11. The sets of control data, stored in the memory unit 38a, are related to the respective power consumption modes from the host system (or the host computer 22). One of the sets of control data is specified by the host system.

The control unit 13 recognizes a power consumption mode, specified by the host system, by detecting a source voltage from the host system, and retrieves one of the sets of control data from the memory unit 38a in accordance with the specified power consumption mode. The control unit 13 controls a read/write operation of the read/write mechanism in accordance with the retrieved control data. The controlling of the read/write operation of the mechanism 17 is carried out by the control unit 13 through the mechanism I/F unit 16.

For example, when a drop of the source voltage from the host system is detected during the operation of the storage device 11, the normal power mode is switched to the low consumption mode. The storage device 11 in one embodiment of the present invention can make effective use of the remaining quantity of the electric energy contained in the battery of the host system. Thus, it is possible to realize a reduction of the power consumption of the storage device 11 in accordance with a change in the source voltage from the host system and prevent the content of a memory of the host system from being changed at random after the switching of the source voltage.

Figure 19:
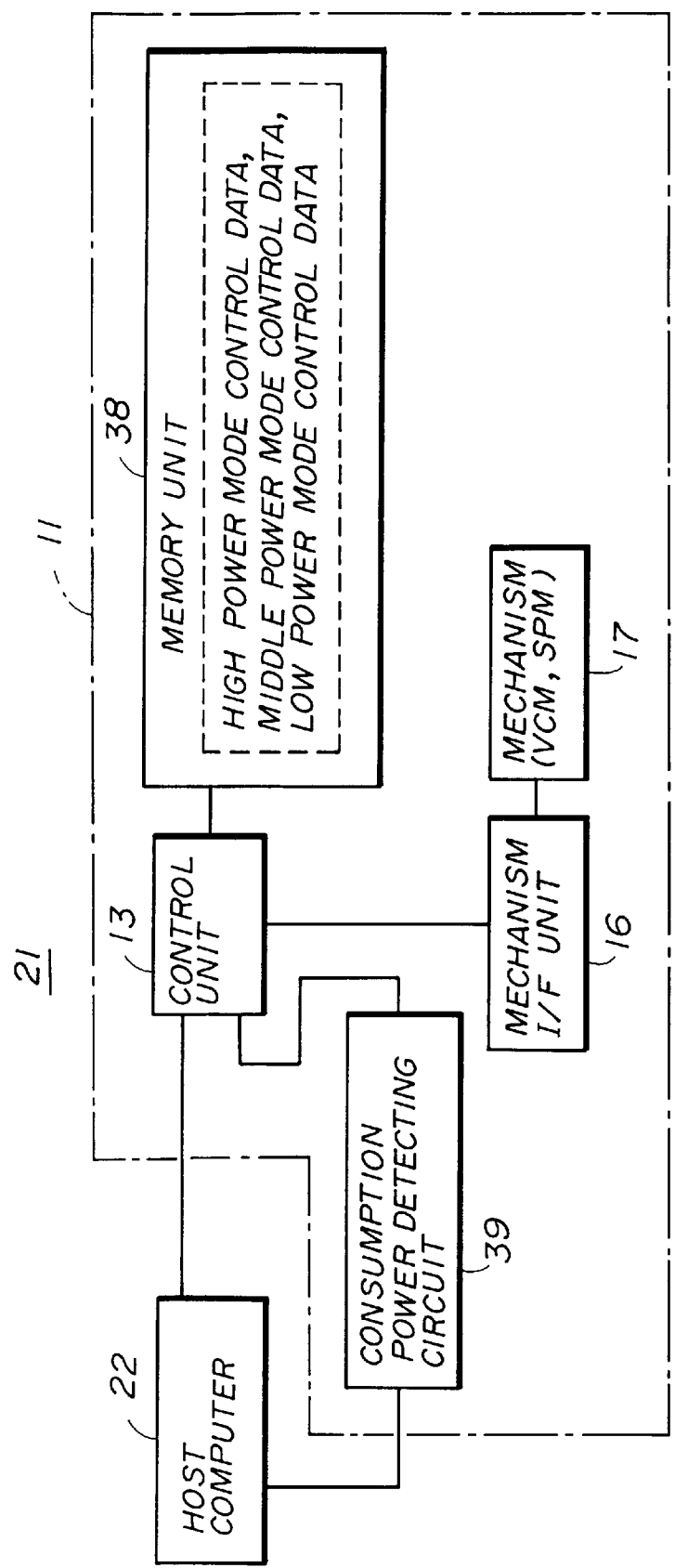
FIG. 19 is a block diagram of a recording/reproducing system to which one embodiment of the present invention is applied.

FIG. 19 shows a recording/reproducing system 21 to which one embodiment of the present invention is applied. In FIG. 19, the recording/reproducing system 21 includes a power consumption detecting circuit 39 provided within the storage device 11, and this power consumption detecting circuit 39 is connected to the control unit 13. A power line from the host computer 22 is connected to the consumption power detecting circuit 39 via the I/F unit 11a. The other component parts of the storage device 11 in FIG. 19 are the same those of the storage device in FIG. 16.

FIG. 20 shows the power consumption detecting circuit 39 of the recording/reproducing system in FIG. 19. In FIG. 20, the power line from the I/F unit 11a is connected to an input of a sensing resistor R4. The input of the sensing resistor R4 and an output thereof are connected to two inputs of an amplifier AMP, and an output of the amplifier AMP is connected to an input of an analog-to-digital converter ADC. An output of the converter ADC is connected to one input of a consumption power evaluating unit 62.

In FIG. 20, the output of the sensing resistor R4 is connected also to an input of a voltage detecting circuit 61. An output of the voltage detecting circuit 61 is connected to the other input of the power consumption evaluating unit 62.

A value of the current of the source power from the host computer 22 is supplied from the ADC to the consumption power evaluating unit 62, and a value of the source voltage from the host computer 22 is supplied from the voltage detecting unit 61 to the evaluating unit 62. Thus, the power consumption evaluating unit 62 evaluates a power consumption based on the supplied current value and the supplied source voltage value. The evaluated power consumption is supplied to the control unit 13 of the storage device 11, and it is supplied also to the host computer 22 when required.

Figure 21A:
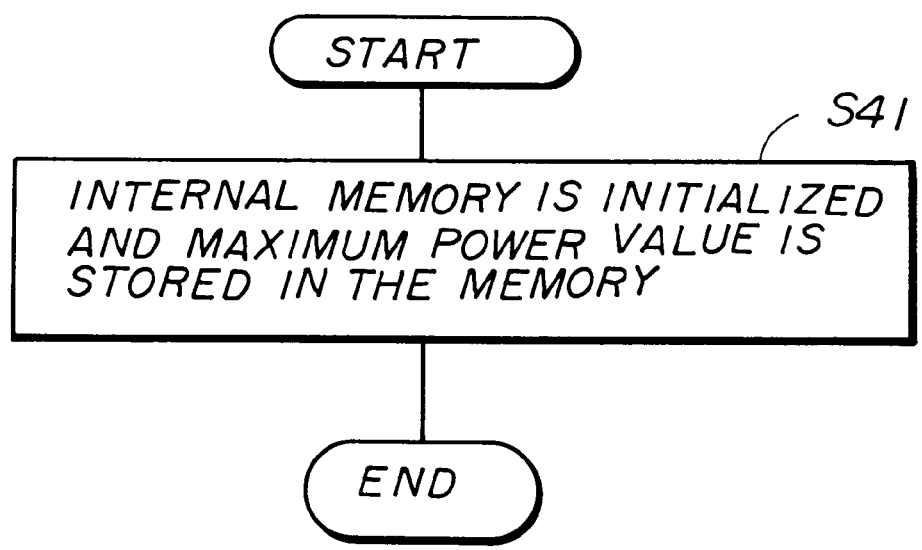
FIGS. 21A, 21B and 21C are flow charts for explaining a seek speed curve determination procedure performed in accordance with a consumption power.
Figure 21B:
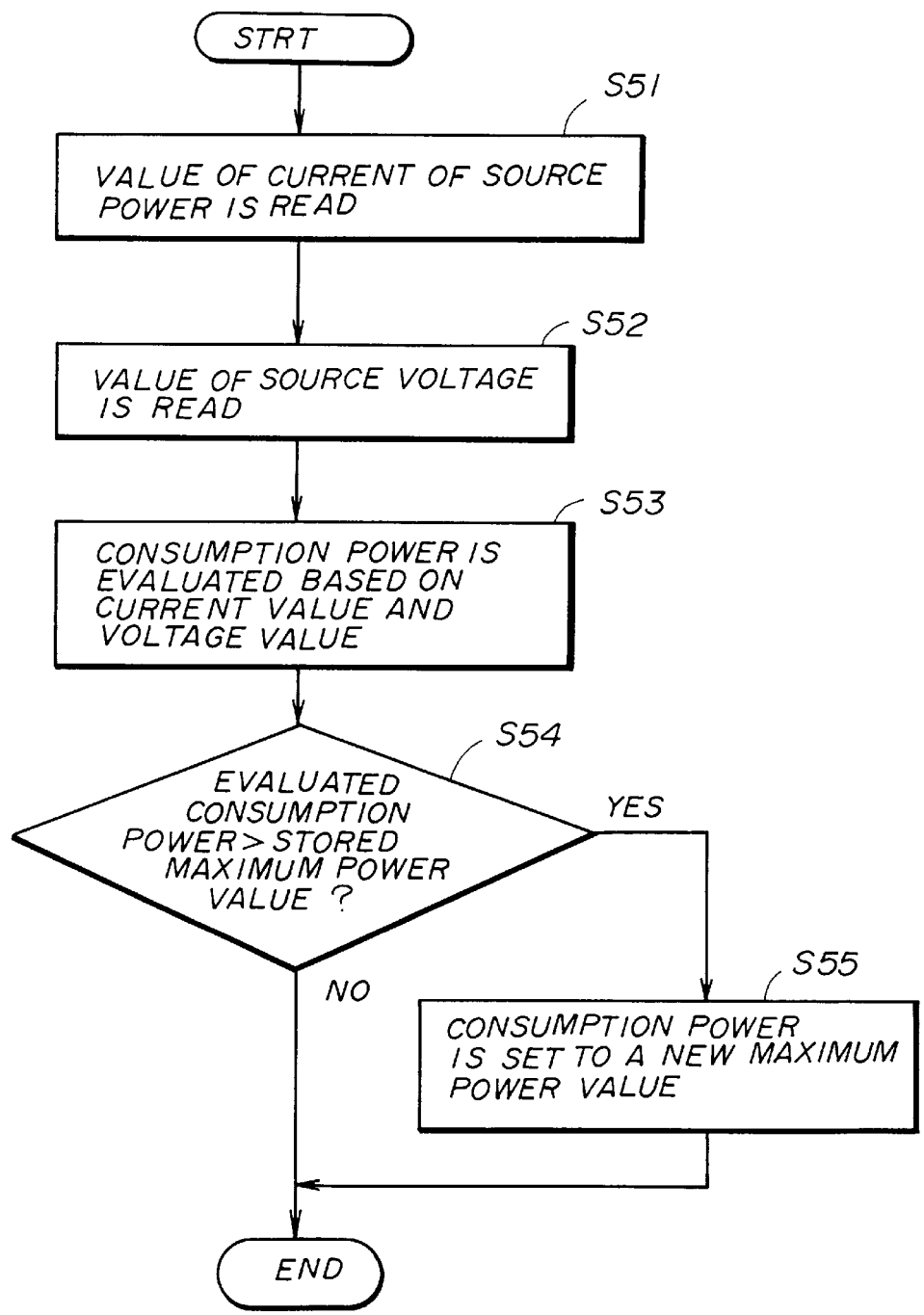
Figure 21C:
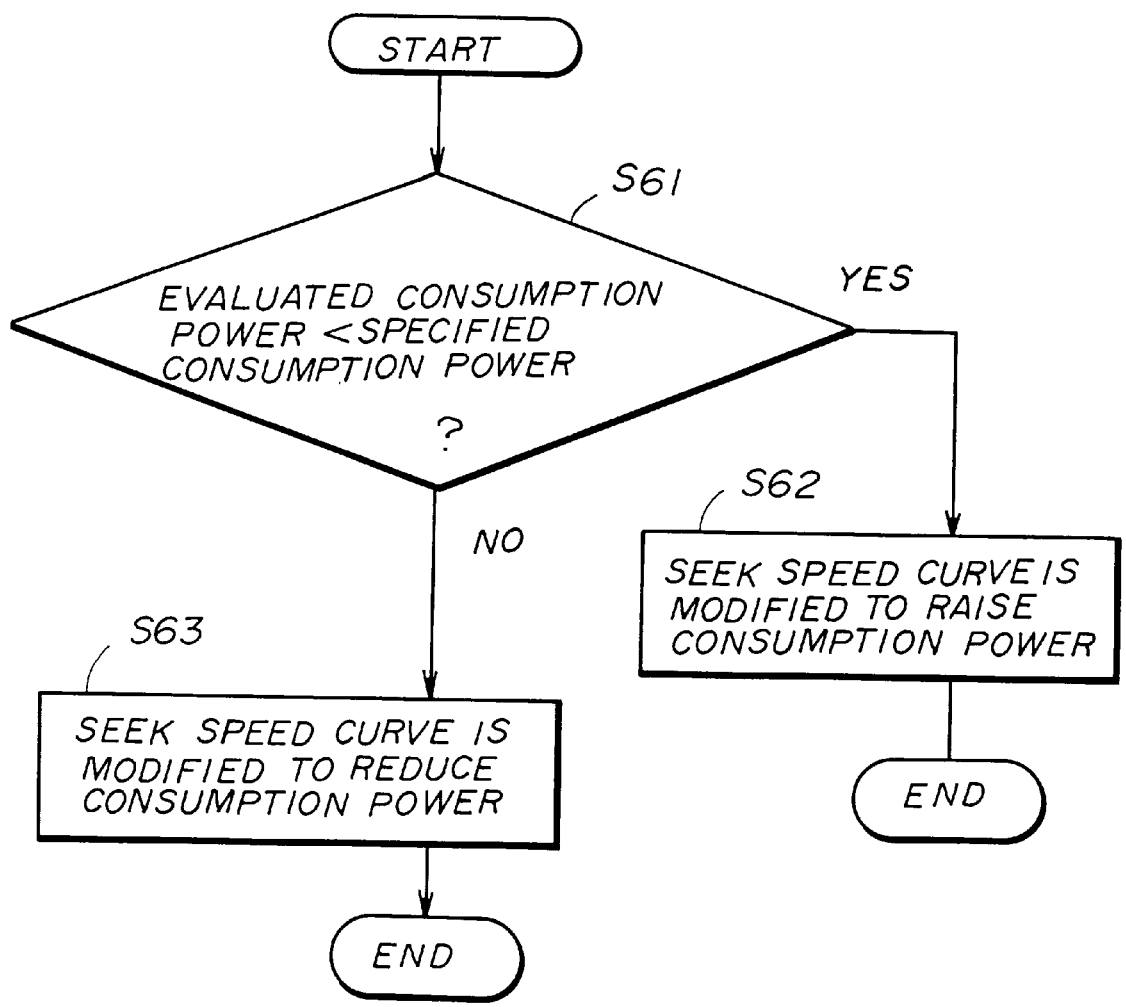

FIGS. 21A, 21B and 21C show a seek speed curve determination procedure performed in accordance with the consumption power by the recording/reproducing system in FIG. 19.

When a seeking operation of the storage device 11 is started, a procedure shown in FIG. 21A is performed by the recording/reproducing system 21 in FIG. 19. The host computer 22 specifies one of predetermined consumption powers which are usable by the storage device 11, at the start of the seeking operation. The control unit 13, at step S41 in FIG. 21A, initializes its internal memory such as a cache memory, and stores a maximum power consumption value in the internal memory. The control unit 13 retrieves one of the sets of control data (or, the high power mode control data, the middle power mode control data and the low power mode control data) from the memory unit 38 in accordance with the power mode specified by the host computer 22. The control unit 13 controls the read/write operation of the mechanism 17 in accordance with the retrieved control data (or the seek speed curve) through the mechanism I/F unit 16.

In the consumption power detecting circuit 39, the consumption power evaluating unit 62, at step S51 in FIG. 21B, reads a value of the current of the supplied source power from the ADC, and, at step S52, reads a value of the supplied source voltage from the voltage detecting unit 61. The power consumption evaluating unit 62, at step S53, evaluates a consumption power based on the value of the current and the value of the source voltage. The evaluated consumption power is supplied from the consumption power detecting circuit 39 to the control unit 13.

The control unit 13, at step S54 in FIG. 21B, detects whether the evaluated consumption power is greater than the maximum consumption power value stored at step S41 in FIG. 21A.

If the result at step S54 is affirmative, the evaluated consumption power is set to a new maximum consumption power value, and the seek speed curve is modified according to the new maximum consumption power value. If the result at step S54 is negative, the read/write operation of the mechanism 17 is controlled in accordance with the evaluated consumption power. This procedure including the above steps in FIG. 21B is periodically performed during the seek operation.

At the end of the seek operation, the control unit 13 performs the procedure shown in FIG. 21C. Step S61 detects whether the evaluated consumption power is smaller than the consumption power specified by the host computer 22. If the result at step S61 is affirmative, step S62 modifies the seek speed curve to raise the consumption power of the storage device 11. If the result at step S61 is negative, step S63 modifies the seek speed curve to reduce the consumption power of the storage device 11.

Alternatively, the result of the detection by the consumption power detecting circuit 39 is sent back to the host computer 22. The host computer 22 may carry out the controlling of the read/write operation of the read/write mechanism by taking into account the consumption power supplied from the storage device 11.

Figure 22:
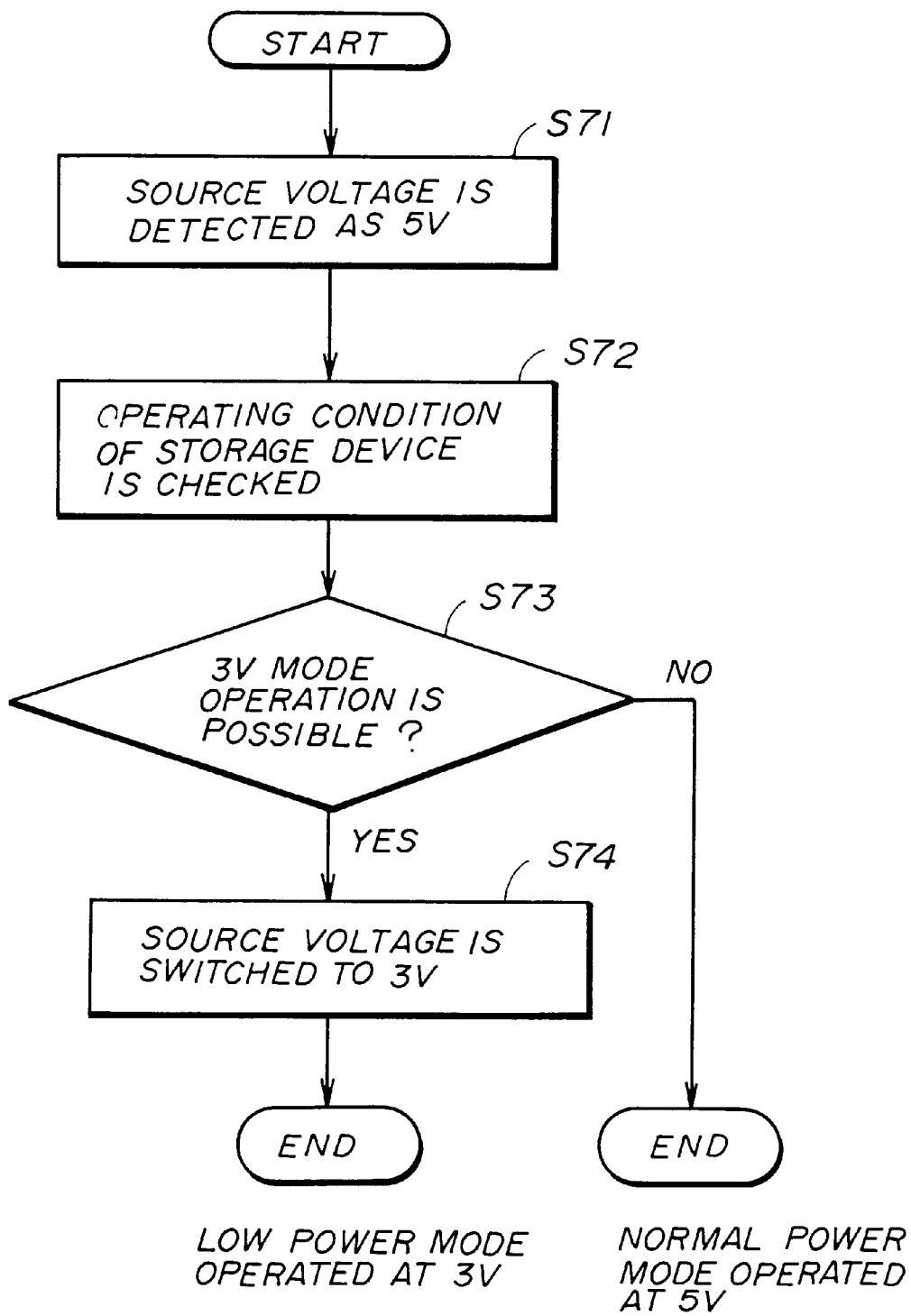
FIG. 22 is a flow chart for explaining a source voltage switching procedure performed when a low power mode is specified.

FIG. 22 shows a source voltage switching procedure performed by the recording/reproducing system in FIG. 19 when a low power mode is specified. After the storage device 11 is powered on, the source voltage of 5 V from the host computer 22 is supplied to the storage device 11. When the low power mode is specified by the host computer 22, the control unit 13 performs the source voltage switching procedure in FIG. 22. Step S71 detects the source voltage supplied from the host computer 22 as being 5 V. Step S72 checks that the low power mode operation of the mechanism 17 is possible by receiving a signal from the mechanism I/F unit 16. Step S73 detects whether 3 V mode operation of the mechanism 17 is possible.

When a high speed operation of the mechanism 17 is required, the result at step S73 is negative. The source voltage switching is not performed at this time, and the 5 V mode operation of the mechanism 17 is continued. When a high speed operation of the mechanism 17 is not required, the result at step S73 is affirmative. The switching of the source voltage, supplied from the host computer 22, from 5 V to 3 V is performed at step S74 in FIG. 22, and the low mode operation of the storage device 11 is started.

In the recording/reproducing system 21, the switching from one of the source voltages to another source voltage or vice versa can be performed in accordance with the instruction input from an operator.

In addition, a consumption power detecting circuit 39 in another embodiment of the present invention may be connected to a source power supplying terminal of the host computer 22. This consumption power detecting circuit 39 detects the consumption power of the storage device 11.

Accordingly, the storage device according to the present invention can be safely and stably operated at the consumption power specified by the host computer 22. A reduction of the consumption power of the storage device 11 is thus realized according to the present invention.

Figure 23:
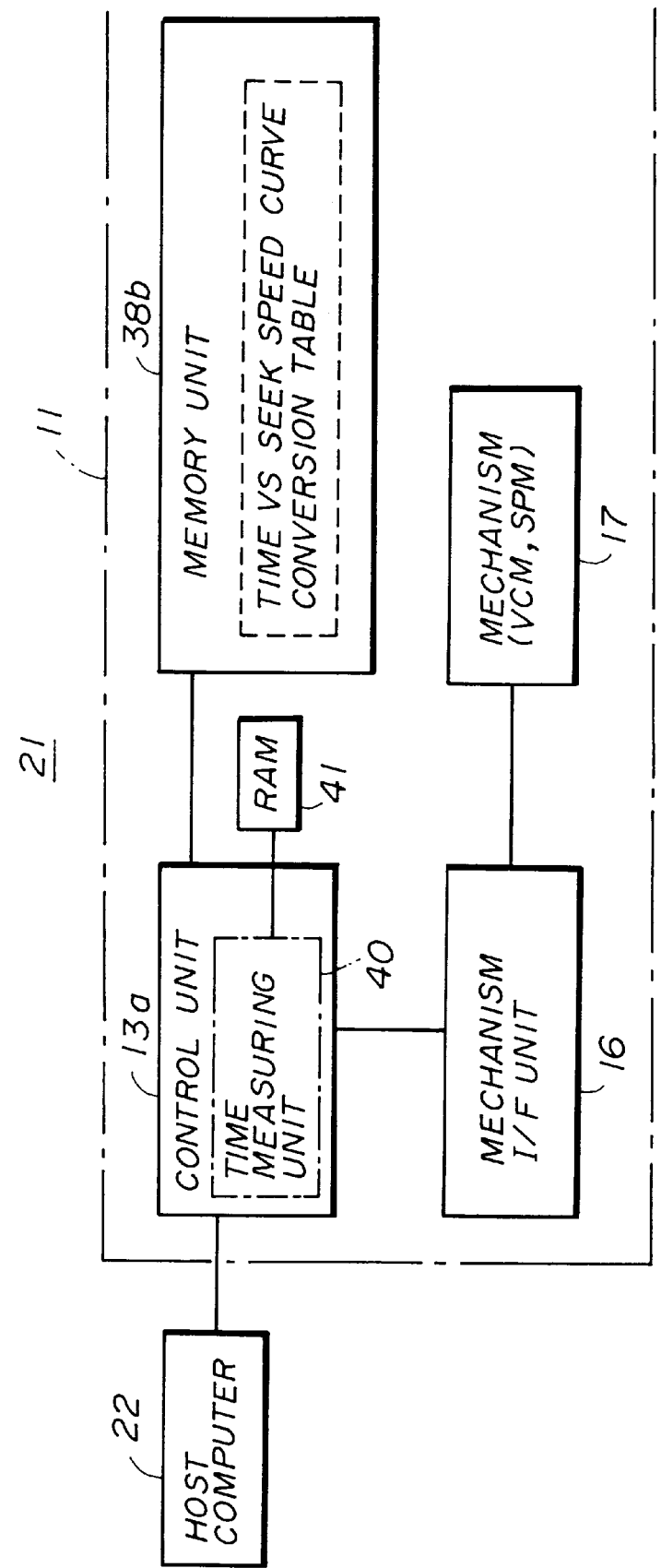
FIG. 23 is a block diagram of a recording/reproducing system to which one embodiment of the present invention is provided.

FIG. 23 shows a recording/reproducing system 21 to which one embodiment of the present invention is applied. In FIG. 23, the recording/reproducing system 21 includes the host computer 22 and the storage device 11 connected to the host computer 22. The storage device 11 includes a control unit 13a which controls a read/write operation of the mechanism 17 through the mechanism I/F unit 16, and a memory unit 38b in which seek speed control data of the mechanism 17 related to an interval of time from an issuing of a seek command to a receipt of a read/write command is stored.

The control unit 13a in FIG. 23 includes a time measuring unit 40 which measures an interval of time from the issuing of a seek command to the receipt of a read/write command. A RAM (random access memory) 41 is connected to the control unit 13a, and the measured time interval is stored in the RAM 41. The time interval stored in the RAM 41 may be retrieved by the control unit 13a. In the memory unit 38a, a conversion table including the seek speed curves vs. the time interval values is stored, and one of the seek speed curves in accordance with the measured time interval is retrieved from the memory unit 38b by the control unit 13a. The seek speed curve retrieved from the conversion table stored in the memory unit 38b is the result of the conversion of the seek speed control data by the measured time interval. The control unit 13a controls a read/write operation of the mechanism 17 in accordance with the converted seek control data.

Figure 24A:
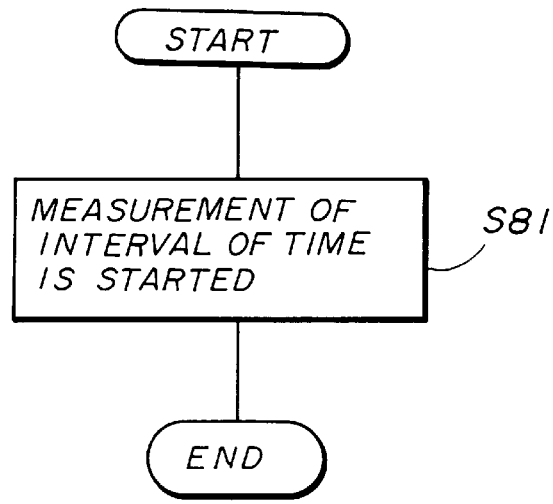
FIGS. 24A and 24B are flow charts for explaining a seek speed curve determination procedure performed by the recording/reproducing system in FIG. 23.
Figure 24B:
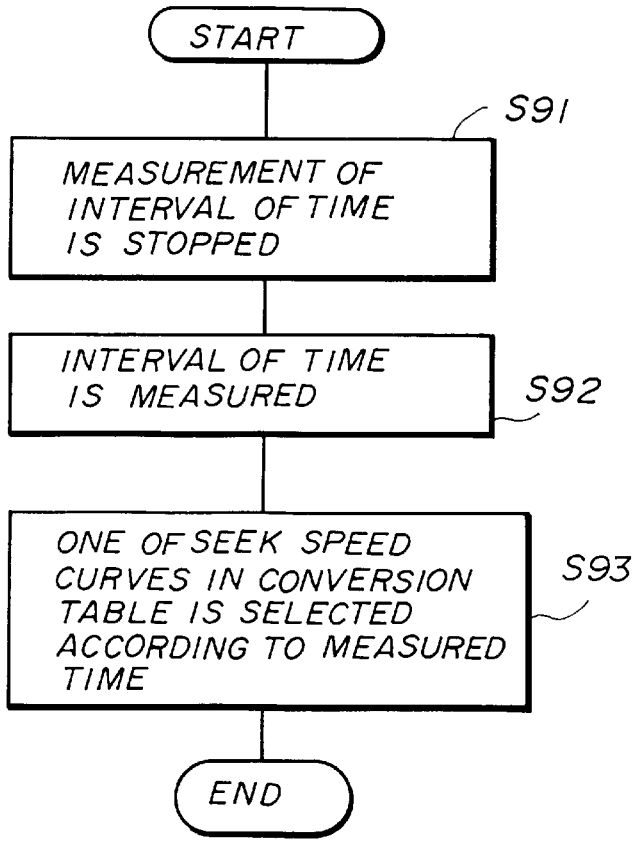

FIGS. 24A and 24B show a seek speed conversion procedure performed by the recording/reproducing system 21 in FIG. 23. In the above recording/reproducing system 21, the control unit 13a, at step S81 in FIG. 24A, starts the measurement of the time interval by the time measuring unit 40 when a seek command sent from the host computer 22 is received. When a read/write command from the host computer 22 is received, the control unit 13a controls a read/write operation of the mechanism 17 in accordance with the control data retrieved from the memory unit 38b through the mechanism I/F unit 16.

When the read/write command from the host computer 22 is received, the control unit 13a, at step S91 in FIG. 24B, stops the measurement of the time interval by the time measuring unit 40. The control unit 13a, at step S92, receives the measured interval of time from the issuing of the seek command to the receipt of the read/write command from the time measuring unit 40, and stores the measured time interval in the RAM 41.

The control unit 13a accumulates the measured time intervals stored in the RAM 41 and checks whether a waiting condition of the storage device 11 is extensively continued. The control unit 13a, at step S93 in FIG. 24B, selects one of the seek speed curves in the conversion table stored in the memory unit 38*b* according to the measured time interval when the waiting condition of the storage device 11 is extensively continued. The control unit 13*a* controls a read/write operation of the mechanism 17 in accordance with the selected seek control data. Accordingly, the storage device according to the present invention carries out a seeking operation at a seek speed in accordance with the seek command sent from the host computer 22 and realizes a reduction of the consumption power of the storage device.

FIG. 25 shows a recording/reproducing system 21 to which one embodiment of the present invention is applied. In FIG. 25, the recording/reproducing system 21 includes the host computer 22 and a storage device 11 connected to the host computer 22. The storage device 11 includes the control unit 13, a battery backup memory unit 42, a source voltage monitoring unit 43, and the mechanism I/F unit 16 connected to the mechanism 17. The mechanism I/F unit 16 and the mechanism 17 are the same as those of the above-described embodiments.

The source voltage monitoring unit 43 is connected to the host computer 22 and detects a source power voltage from the host computer 22. The result of the monitoring from the source voltage monitoring unit 43 is transferred to the control unit 13.

In the backup memory unit 42, the seek control data used to control the read/write operation of the mechanism 17 through the mechanism I/F unit 17 is stored, and writing data from the host computer 22 to be written onto the recording medium within the storage device 11 is retained even when a lack of the source power of the host computer 22 has occurred. That is, this backup memory unit 42 serves as a memory buffer for storing the writing data from the host computer 22 when the battery of the host computer 22 is powered down. A flash memory unit may be used instead of the battery backup memory unit 42.

The control unit 13 controls the read/write operation of the mechanism 17 through the mechanism I/F unit 16 in accordance with the seek control data, wherein data is read from or written onto the recording medium when a seek request sent from the host computer 22 is received. Further, the control unit 13 in this embodiment allows the writing data from the host computer 22 to be stored in the backup memory unit 42 when the source power voltage detected by the source voltage monitoring unit 43 is reduced to stop the operation of the mechanism 17.

Figure 26A:
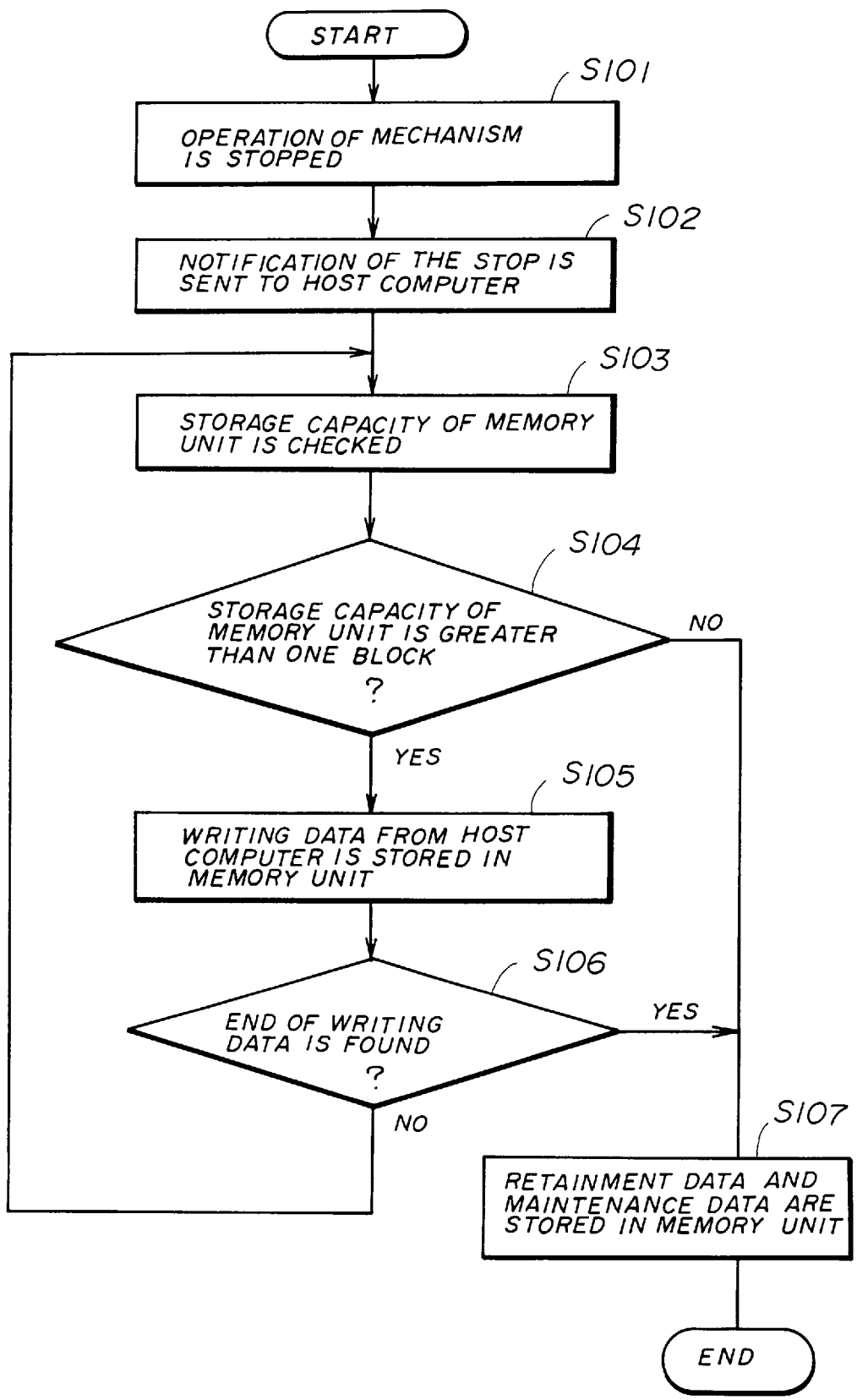
FIGS. 26A and 26B are flow charts for explaining a writing data retainment control procedure performed by the recording/reproducing system in FIG. 25.
Figure 26B:
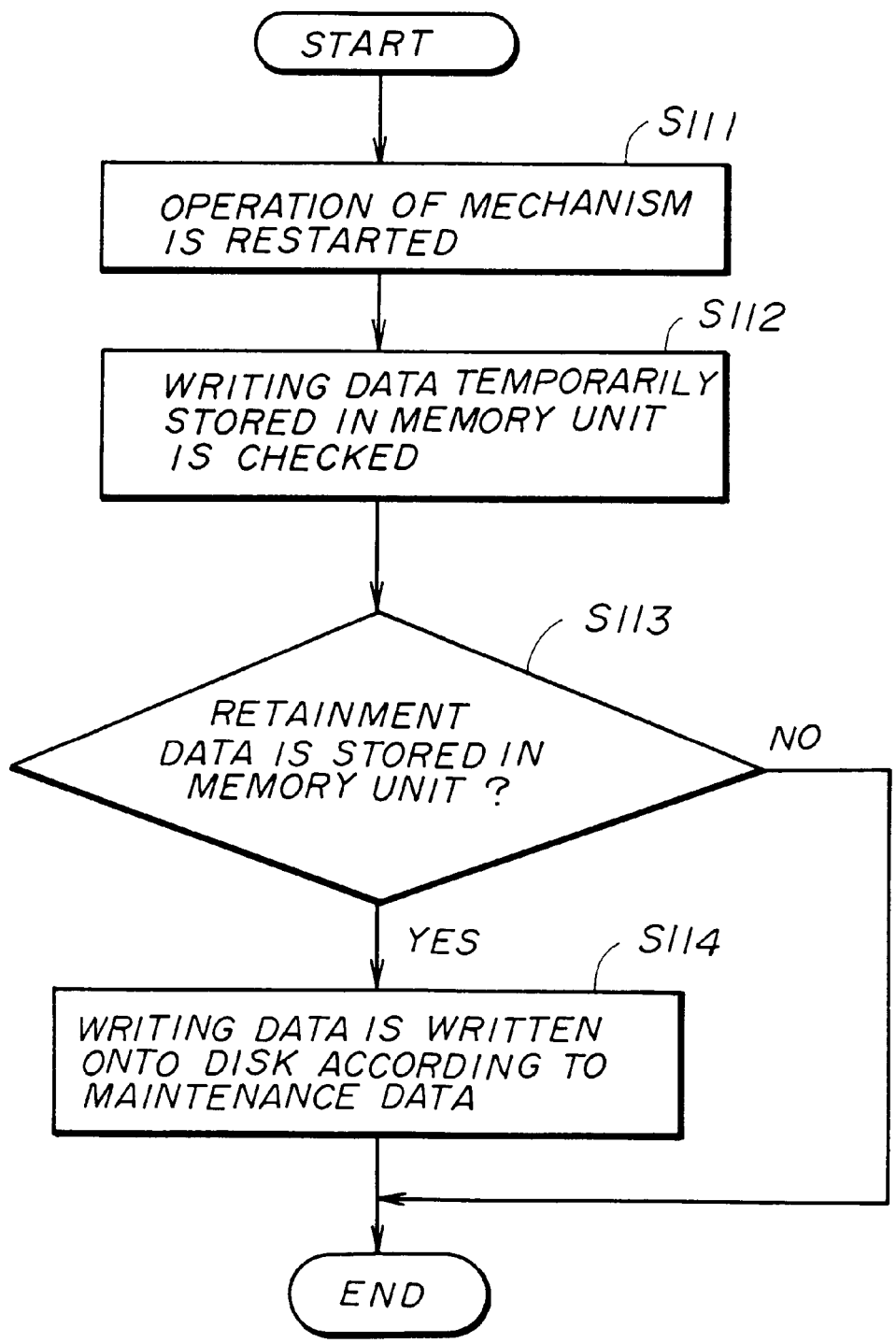

FIGS. 26A and 26B show a writing data retainment control procedure performed by the recording/reproducing system 21 in FIG. 25. When the source power voltage detected by the source voltage monitoring unit 43 is reduced to a predetermined lower voltage limit, the control unit 13, at step S101 in FIG. 26A, stops the read/write operation of the mechanism 17. Step S102 transfers a notification of the stop of the read/write mechanism to the host computer 22.

The control unit 13, at step S103, checks the remaining storage capacity of the backup memory unit 42. Step S104 detects whether the remaining storage capacity of the memory unit 42 is greater than or equal to one block (which is equivalent to one sector, or 512 bytes in a case of a magnetic disk). If the result at step S104 is affirmative, step S105 receives the writing data from the host computer 22 and stores the received data in the backup memory unit 42.

The control unit 13, at step S106, detects whether the end of the writing data from the host computer 22 is found. If the result at step S106 is negative, the above steps S103 through S105 are repeated.

If the result at step S104 is negative or if the result at step S106 is affirmative, step S107 stores retainment data which indicates that the writing data is retained in the memory unit 42, and stores the maintenance data related to the writing data (e.g., the write address, the block number and the others) in the memory unit 42.

When the storage device 11 is switched on thereafter, the read/write operation of the mechanism 17 is restarted at step S111 in FIG. 26B. The control unit 13, at step S112, checks the backup memory unit 42 for the writing data retained therein. Step S113 detects whether the retainment data is stored in the memory unit 42.

If the result at step S113 is affirmative, step S114 controls the write operation of the mechanism 17 through the mechanism I/F unit 16 to write the retained writing data to the disk within the storage device 11 in accordance with the maintenance data from the backup memory unit 42.

If the result at step S113 is negative, the writing data retainment control procedure ends without performing the above step S114. After the writing data, retained in the backup memory unit 42, is written to the disk, the control unit 13 is in a waiting condition until the receipt of a next command.

Accordingly, the storage device according to the present invention can prevent the writing data to be written onto the disk from abnormally residing on an internal memory of the host computer 22 due to the lack of electric power contained in the battery of the host computer 22. Thus, it is possible to realize a safe and stable operation of the storage device 11 after the read/write operation of the read/write mechanism is stopped due to the lack of electric energy contained in the battery.

Further, the present invention is not limited to the above-described embodiments, and variations and modifications may be made without departing from the scope of the present invention.

What is claimed is:

1. A storage device in which one of plural source voltage levels is selectively supplied from a host system and an access is sent from the host system to read data from or write data onto a recording medium within the storage device, comprising:

a read/write mechanism which is actuated in accordance with one of plural sets of control data so that a read/write operation is carried out to read the data from or write the data onto the recording medium within the storage device;

detection means for detecting a source voltage level supplied from the host system, and for detecting whether the source voltage level from the host system is within a first operational range or within a second operational range, said first operational range and said second operational range being discrete and an intermediate range being provided between said first and second operational ranges;

control means for controlling the read/write operation of said read/write mechanism in accordance with the source voltage detected by said detection means;

memory means for storing a first set of control data related to said first operational range and a second set of control data related to said second operational range, each of said first and second sets of control data defining a seek speed value of the read/write mechanism for the detected source voltage level; and reset means, coupled to said detection means, for resetting said control means to an initial condition when the source voltage level from the host system is detected to be within the intermediate range between said first operational range and said second operational range, so that the controlling of the read/write mechanism is withheld until the end of a switching from one source voltage level to another source voltage level, wherein said control means reads out one of said first set of control data and said second set of control data from said memory means in accordance with the source voltage detected by said detection means, so that said read/write mechanism is actuated in accordance with the control data read out by said control means.

2. The storage device according to claim 1, wherein said detection means comprises:

first, second and third resistors connected in series, the source voltage being applied to said first resistor, and said third resistor being connected to ground;

a first comparator for comparing a divided voltage of the source voltage at a connection point between said first and second resistors with a reference voltage; and a second comparator for comparing a divided voltage of the source voltage at a connection point between said second and third resistors with the reference voltage; and said reset means determines based on output signals received from said first and second comparators whether the source voltage falls within an intermediate range between first and second operational ranges, and if the source voltage falls within the intermediate range, resets said control means to an initial condition.

3. A storage device in which one of plural source voltage levels is selectively supplied from a host system and an access is sent from the host system to read data from or write data onto a recording medium within the storage device, comprising:

a read/write mechanism which is actuated in accordance with one of plural sets of control data so that a read/write operation is carried out to read the data from or write the data onto the recording medium;

detection means for detecting a source voltage level supplied from the host system, and for detecting whether the source voltage level is within a first operational range or within a second operational range, said first operational range and said second operational range being discrete and an intermediate range being provided between said first and second operational ranges;

control means for controlling the read/write operation of said read/write mechanism in accordance with the source voltage detected by said detection means;

memory means for storing a first set of control data related to said first operational range and a second set of control data related to said second operational range, each of said first and second sets of control data defining a seek speed value of the read/write mechanism for the detected source voltage level; and read/write inhibition means, coupled to said detection means, for inhibiting said control means from controlling the read/write operation of the read/write mechanism when the source voltage level from the host system is detected to be within the intermediate range between said first operational range and said second operational range, so that the controlling of the read/write mechanism is withheld until the end of a switching from one source voltage level to another source voltage level, wherein said control means reads out one of said first set of control data and said second set of control data from said memory means in accordance with the source voltage detected by said detection means, so that said read/write mechanism is actuated in accordance with the control data read out by said control means.

4. The storage device according to claim 3, wherein said detection means comprises:

first, second and third resistors connected in series, the source voltage being applied to said first resistor, and said third resistor being connected to ground;

a first comparator for comparing a divided voltage of the source voltage at a connection point between said first and second resistors with a reference voltage; and a second comparator for comparing a divided voltage of the source voltage at a connection point between said second and third resistors with the reference voltage; and said read/write inhibition means determines based on output signals received from said first and second comparators whether the source voltage falls within said intermediate range between said first and second operational ranges, and if the source voltage falls within the intermediate range, inhibits said control means from controlling the read/write operation of said read/write mechanism.

5. A storage device in which one of plural source voltage levels is selectively supplied from a host system and an access is sent from the host system to read data from or write data onto a recording medium within the storage device, comprising:

a read/write mechanism which is actuated in accordance with a selected one of sets of control data so that a read/write operation is carried out to read the data from or write the data onto the recording medium;

voltage fluctuation preventing means for restricting a rate of change of the source voltage, supplied to the storage device, below a redetermined rate of change when the source voltage from the host system is switched from one voltage level to another voltage level; and control means for controlling the read/write operation of said read/write mechanism in accordance with the source voltage whose rate of change is restricted by said voltage fluctuation preventing means.

6. The storage device according to claim 5, further comprising detection means for detecting the source voltage supplied from the host system, and for detecting whether the source voltage level from the host system has been switched to another source voltage level.

7. The storage device according to claim 5, further comprising a memory unit for storing sets of control data related to the respective source voltages from the host system, wherein said control means selects said selected one of the sets of control data in accordance with the source voltage whose rate of change is restricted, so that the selected one of the sets of control data is retrieved from said memory unit by said control means.

8. The storage device according to claim 7, further comprising detection means for detecting the source voltage supplied from the host system, and for detecting whether the source voltage level from the host system has been switched to another source voltage level.

9. A system comprising a host computer and a storage device connected to the host computer, wherein one of plural source voltage levels is selectively supplied from the host computer to the storage device, and an access is sent from the host computer to read data from or write data onto a recording medium within the storage device, said storage device including:

a read/write mechanism which is actuated in accordance with a selected one of sets of control data so that a read/write operation is carried out to read the data from or write the data onto the recording medium; and control means for controlling the read/write operation of the read/write mechanism in accordance with a source voltage supplied from the host computer, said host computer including:

source voltage switching means for switching between plural source voltage levels, supplied to the storage device, to another source voltage level; and reset means for resetting said control means of said storage device to an initial condition when the switching by said source voltage switching means from one source voltage level to another source voltage level is detected as being in progress, so that the controlling of the read/write mechanism is withheld until the end of the switching.

10. A system comprising a host computer and a storage device connected to the host computer, wherein one of plural source voltage levels is selectively supplied from the host computer to the storage device, and an access is sent from the host computer to read data from or write data onto a recording medium within the storage device, said storage device including:

a read/write mechanism which is actuated in accordance with a selected one of sets of control data so that a read/write operation is carried out to read the data from or write the data onto the recording medium; and control means for controlling the read/write operation of the read/write mechanism in accordance with a source voltage supplied from the host computer, said host computer including:

source voltage switching means for switching between one of the plural source voltage levels, supplied to the storage device, to another source voltage level; and voltage fluctuation preventing means for restricting a rate of change of the source voltage, supplied to the storage device, below a predetermined rate of change when the switching by said source voltage switching means from one source voltage level to another source voltage level is detected as being in progress, so that the controlling of the read/write mechanism is withheld until the end of the switching.

\* \* \* \* \*

UNITED STATES PATENT AND TRADEMARK OFFICE
CERTIFICATE OF CORRECTION

PATENT NO. : 5,907,859
DATED : May 25, 1999
INVENTOR(S) : Shimada et al.

It is certified that error appears in the above-identified patent and that said Letters Patent is hereby corrected as shown below:

Title page,

Under "[73] Assignee" delete "Fukitsu" and insert --Fujitsu-- therefor

Column 2, line 62, delete "therefor"

Column 11, line 4, delete "S1" and insert --S11-- therefor

Signed and Sealed this

Fourth Day of April, 2000

Attest:

Q. TODD DICKINSON

Attesting Officer

Director of Patents and Trademarks